(12) United States Patent
Gnilova et al.

(10) Patent No.: US 12,456,378 B2
(45) Date of Patent: Oct. 28, 2025

(54) METHOD AND A SYSTEM FOR ASSIGNING VEHICLES TO TAXI ORDERS

(71) Applicant: Direct Cursus Technology L.L.C, Dubai (AE)

(72) Inventors: Olga Gnilova, Reutov (RU); Aleksandr Tsarkov, Moscow (RU); Sergey Vorontsov, Kaliningrad (RU)

(*) Notice: Subject to any disclaimer, the term of this patent is extended or adjusted under 35 U.S.C. 154(b) by 130 days.

(21) Appl. No.: 18/393,529

(22) Filed: Dec. 21, 2023

(65) Prior Publication Data

US 2024/0212505 A1 Jun. 27, 2024

(30) Foreign Application Priority Data

Dec. 22, 2022 (RU) .............. RU2022133958

(51) Int. Cl.
*G08G 5/00* (2025.01)
*G08G 1/00* (2006.01)

(52) U.S. Cl.
CPC ............. *G08G 1/202* (2013.01); *G08G 1/207* (2013.01)

(58) Field of Classification Search
CPC ................................ G08G 1/202; G08G 1/207
See application file for complete search history.

(56) References Cited

U.S. PATENT DOCUMENTS

| | | | |
|---|---|---|---|
| 8,315,792 B2 | 11/2012 | Speier et al. | |
| 8,606,512 B1 | 12/2013 | Bogovich et al. | |
| 8,612,139 B2 | 12/2013 | Wang et al. | |
| 9,898,759 B2 | 2/2018 | Khoury | |
| 9,927,252 B1 | 3/2018 | Chokshi et al. | |
| 9,932,033 B2 | 4/2018 | Slusar et al. | |
| 10,096,038 B2 | 10/2018 | Ramirez et al. | |
| 10,152,053 B1 | 12/2018 | Smith et al. | |
| 10,157,422 B2 | 12/2018 | Jordan Peters et al. | |
| 10,204,528 B2 | 2/2019 | Truong et al. | |

(Continued)

FOREIGN PATENT DOCUMENTS

| | | |
|---|---|---|
| CN | 112749819 A | 5/2021 |
| CN | 113283548 B | 10/2021 |

(Continued)

OTHER PUBLICATIONS

Notice of Allowance dated Apr. 16, 2025 received in respect of a related U.S. Appl. No. 18/241,834.

(Continued)

*Primary Examiner* — Mathew Franklin Gordon
(74) *Attorney, Agent, or Firm* — BCF LLP

(57) ABSTRACT

A method and a server for assigning vehicles to taxi orders are provided. The method comprises: receiving an indication of a plurality of taxi orders in a given area; identifying a set of candidate vehicles for assigning among the plurality of taxi orders; generating, in the set of candidate vehicles, an indication of a model candidate vehicle, which is associated with a threshold ETA for the given taxi order; assigning the set of candidate vehicles among the plurality of taxi orders; in response to a given taxi order being assigned to the model candidate vehicle: suspending the given taxi order from being assigned to any one of the set of candidate vehicles during the given order assignment iteration; and including the given taxi order in a following plurality of taxi orders to be received during a next order assignment iteration, following the given order assignment iteration.

20 Claims, 8 Drawing Sheets

(56) References Cited

U.S. PATENT DOCUMENTS

| | | |
|---|---|---|
| 10,650,618 B2 | 5/2020 | Li |
| 10,733,460 B2 | 8/2020 | Heck et al. |
| 10,883,850 B2 | 1/2021 | Guidotti et al. |
| 10,960,893 B2 | 3/2021 | Chowdhury et al. |
| 11,335,200 B2 | 5/2022 | Tong et al. |
| 2006/0247852 A1 | 11/2006 | Kortge et al. |
| 2009/0210142 A1 | 8/2009 | Couckuyt et al. |
| 2011/0106370 A1 | 5/2011 | Duddle et al. |
| 2015/0081362 A1 | 3/2015 | Chadwick et al. |
| 2017/0091677 A1 | 3/2017 | Andreev et al. |
| 2017/0206622 A1 | 7/2017 | Pavlov et al. |
| 2020/0003569 A1 | 1/2020 | Polanowski |
| 2020/0082721 A1 | 3/2020 | Chen et al. |
| 2020/0160251 A1 | 5/2020 | Wynter et al. |
| 2020/0286003 A1 | 9/2020 | Nagarajan et al. |
| 2020/0286310 A1 | 9/2020 | Carver et al. |
| 2020/0318983 A1 | 10/2020 | Shirani-Mehr et al. |
| 2020/0334762 A1 | 10/2020 | Carver et al. |
| 2020/0339159 A1 | 10/2020 | Zhong et al. |
| 2020/0393257 A1 | 12/2020 | Dryjanski et al. |
| 2020/0408540 A1 | 12/2020 | Schreier et al. |
| 2021/0005087 A1 | 1/2021 | Felt et al. |
| 2021/0164792 A1 | 6/2021 | Pal et al. |
| 2022/0065639 A1 | 3/2022 | Mistele et al. |
| 2022/0270177 A1 | 8/2022 | Chintakindi et al. |
| 2022/0276063 A1 | 9/2022 | Berman et al. |
| 2024/0085193 A1 | 3/2024 | Tisseur et al. |

FOREIGN PATENT DOCUMENTS

| | | |
|---|---|---|
| CN | 113743767 A | 12/2021 |
| CN | 114187072 A | 3/2022 |
| DE | 102012220146 A1 | 5/2014 |
| DE | 102017009518 A1 | 3/2018 |
| RU | 2308385 C2 | 10/2007 |
| RU | 2696323 C2 | 8/2019 |
| RU | 2754066 C2 | 8/2021 |
| WO | 2016135561 A1 | 9/2016 |

OTHER PUBLICATIONS

Notice of Allowance and search report dated Apr. 23, 2025 issued in respect of the counterpart Russian Patent Application No. RU 2022133958.

Russian Search Report dated Nov. 7, 2024 issued in respect of the counterpart Russian Patent Application No. RU 2022123664.

METHOD AND A SYSTEM FOR ASSIGNING VEHICLES TO TAXI ORDERS

CROSS-REFERENCE

The present application claims priority to Russian Patent Application No. 2022133958, entitled "Method and a System for Assigning Vehicles to Taxi Orders", filed Dec. 22, 2022, the entirety of which is incorporated herein by reference.

FIELD OF TECHNOLOGY

The present technology relates generally to online transportation platforms; and in specific, to methods and systems of assigning vehicles to taxi orders submitted by users of the online transportation platforms.

BACKGROUND

Recent developments in the field of transportation services have led to evolution of various online platforms that cater to travelling requirements of passengers. Specifically, online transportation platforms that offer on-demand vehicle services to the passengers have emerged as a popular solution to overcome the ever-increasing demand for the transportation services. Such online transportation platforms are operated by ridesharing companies, such as a Uber™ ridesharing company, a Lyft™ ridesharing company, and a Yandex.Taxi™ ridesharing company, which offer, via a website and/or a mobile application, a "ride" for a user of the online transportation platform.

Typically, a passenger initiates a given taxi order to travel from a pick-up location to a drop-off location. For example, the passenger can submit the given taxi order by pressing a "call a vehicle" button of the passenger's mobile application on a frontend of the online transportation platform. In response, a server on a backend of the online transportation platform can be configured to (i) process the given taxi order; and (ii) determine a suitable vehicle to cater to the given taxi order. For example, the server may be configured to receive taxi orders submitted in a given area (such as a county, a city, a district, and the like) in iterations, which can be defined with a certain step in time. A variety of factors may affect allocation of a vehicle to the given taxi order.

For example, the allocation may be performed while considering whether a given driver of a candidate vehicle has already driven for a long duration and is currently exhausted. This may adversely affect the driving capability of the driver and the travel experience of the passenger. In another example, the allocation may be performed while minimizing an aggregate estimated time of arrival (ETA) for a plurality of current taxi orders, having been submitted by passengers in the given area by a given order assignment iteration. However, such approaches may not be effective in addressing needs of specific passengers, and further improvements may hence be desired.

United States Patent Application Publication No.: 2015/0081,362-A1, published on Mar. 19, 2015, assigned to Intel Corp, and entitled "CONTEXT-AWARE DISTRIBUTIVE TAXI CAB DISPATCHING", discloses a cloud-based context-aware distributive taxi cab dispatching service to registered users. A method of providing this service may include receiving, from a user device of a registered user, a request for taxi information, obtaining the requested information from one or more computing devices of one or more taxi cabs or taxi service companies and one or more data stores, and providing the obtained information to the user device. The provided taxi information may be based on a passenger profile of the user and may include a list of taxi cabs recommended based on the profile. The method may further include scheduling a selected taxi cab. The method may also include monitoring the user's location and updating the scheduling of the taxi based on the user's location. The method may also include monitoring the user's location while in a taxi for data collection and safety reasons.

United States Patent Application Publication No.: 2017/0206,622-A1, published on Jul. 20, 2017, assigned to SUOL INNOVATIONS LTD, and entitled "SYSTEMS AND METHODS FOR MATCHING DRIVERS WITH PASSENGERS, WHEREIN PASSENGERS SPECIFY THE PRICE TO BE PAID FOR A RIDE BEFORE THE RIDE COMMENCES", discloses a computer-implemented method for requesting a ride with a specified fare set by a passenger, the method being performed in connection with a computerized system comprising at least a processor and a memory. The method involves: receiving a given taxi order 245 from a passenger with a specified fare set by a passenger; transmitting a given taxi order 245 to the ride requests feed of a driver; selecting a driver in response to the given taxi order 245 from the passenger with a specified fare by receiving driver requests for an order, determining driver device location, determining driver rating, the driver selection based on his/her location and rating; and providing driver selection results to a passenger, the selected driver and other drivers.

United States Patent Application Publication No.: 2020/0160,251-A1, published on May 21, 2020, assigned to International Business Machines Corp, and entitled "ADAPTIVE DISPATCHING ENGINE FOR ADVANCED TAXI MANAGEMENT", discloses a method of managing the adaptive dispatching of a taxi that includes receiving a request for a taxi, the received request being from a passenger; scoring a taxi driver based on at least one of an acceptance rate for assignment, a rejection rate for assignment, an idle rate, and a frequency of job acceptance; scoring the passenger based on at least one of a cancellation rate, a booking frequency, an abandonment rate, and a blacklist factor; matching the passenger to a taxi driver based on the taxi driver score and the passenger score; assigning a passenger to a taxi driver based on one of a conditional historical acceptance rate and a stochastic assignment of either chance constraints or a conditional value at risk; and dispatching the taxi driver to the passenger.

United States Patent Application Publication No.: 2020/0393,257-A1, published on Dec. 17, 2020, assigned to Lyft Inc, and entitled "CASUAL DRIVER RIDE SHARING", discloses a system for casual driver ride sharing including an interface and processor. The interface is to receive a request for a ride from a user, wherein the request includes GPS information for the user. The processor is to determine compatibility between the typical route information and the request for the ride; determine a ranked list based at least in part on the compatibility; and provide a ride offer to a driver of the one or more casual drivers based at least in part on the ranked list.

United States Patent Application Publication No.: 2021/0005,087-A1, published on Jan. 7, 2021, assigned to Verizon Patent and Licensing Inc, and entitled "SERVER FOR COMMUNICATING WITH MOBILE AND VEHICLE DEVICES", discloses one or more servers which may include a first communication interface to communicate with a mobile device; a second communication interface to communicate with devices associated with a plurality of vehicles; and a selection mechanism. The first communication interface may receive, via a network, a request from the mobile device based on an interaction with the mobile device. And, the selection mechanism may determine weighted scores for two or more, of the plurality of vehicle, and select one of the two or more vehicles by using a selection function that improves access to vehicle services and decreases waste of resources used by the plurality of vehicles.

United States Patent Application Publication No.: 2017/0091,677-A1, published on Mar. 30, 2017, assigned to Magenta Corp Ltd, and entitled "VEHICLE BOOKING TECHNIQUE", discloses a method of allocating a set of bookings to a set of vehicles, comprising determining a cost associated with all combinations of booking and vehicle, and selecting a vehicle for each booking in dependence on an overall cost of booking/vehicle combinations being the lowest.

SUMMARY

It is an object of the present technology to ameliorate at least some of the inconveniences present in the prior art. Embodiments of the present technology may provide and/or broaden the scope of approaches to methods of achieving the aims and objects of the present technology. Developers of the present technology have appreciated at least one technical problem associated with the prior art approaches.

Developers of the present technology have appreciated that assigning vehicles to taxi orders can be implemented not only considering the aggregate ETA but also specific preferences of each passenger with respect to their respective upcoming taxi orders. More specifically, according to at least some non-limiting embodiments of the present technology, during the given order assignment iteration, the server on the backend of the online transportation platform can be configured to (i) receive a plurality of taxi orders in the given area; (ii) identify, in the given area, a set of candidate vehicles, which are available for accommodating the plurality of taxi orders; (iii) determine, for each one of the set of candidate vehicles, a respective initial ETA for picking up each one of the plurality of taxi orders; and (iv) modify, for a given candidate vehicle, the respective initial ETA thereof based on whether the given candidate vehicle meets preferences of the respective passengers specified in the given taxi order or not. For example, if the passenger that has submitted the given taxi order specified, among others, the presence of a child seat as a preferred feature of the given candidate vehicle, the backend server of the online transportation platform may be configured either to (i) reduce the respective initial ETA of given candidate vehicle for the given taxi order if the given candidate vehicle offers such a feature; or (ii) increase its respective initial ETA otherwise. Further, the server can be configured to assign the set of candidate vehicles among the plurality of taxi orders by minimizing the aggregate ETA that would then be defined by the so modified respective ETAs of each of the set of candidate vehicles. By doing so, the present methods and systems may allow not only reducing the waiting time of the passengers but also prioritizing vehicles having specific features for those taxi orders where these features have been specified as being most desirous. This may help improve customer satisfaction of the passengers of the online transportation platform.

Also, the developers have realized that the approach to assigning the set of candidate vehicles based on minimizing the aggregate ETA may have certain flaws. For example, during the given iteration, the distribution of the set of candidate vehicles within the given area can be such that, although the condition of the minimized aggregate ETA is met, an individual ETA for picking up a given taxi order can be relatively long, which can affect customer satisfaction of the user submitted the given taxi order.

Thus, the developers of the present technology have realized that accommodating only those taxi orders that can be implemented within a predetermined ETA threshold can allow fulfilling the taxi orders more effectively. More specifically, in at least some non-limiting embodiments of the present technology, prior to optimizing the aggregate ETA, the server can be configured to generate, in the set of candidate vehicles, an indication of a so called "model" vehicle candidate, which is associated with the predetermined threshold ETA for picking up the given taxi order. Thus, if after the optimization of the aggregate ETA at the given order assignment iteration, the given taxi order is assigned to the model candidate vehicle, the server can be configured to suspend the given taxi order until a next order assignment iteration, during which the server will include the given taxi order in a following respective plurality of taxi order.

By doing so, the server can be configured to allow some time for the distribution of the candidate vehicles to change in the given area, which may result in identifying, during the next order assignment iteration, a closer actual candidate vehicle, associated with the respective ETA for picking up the given taxi order, which is less than the predetermined threshold ETA. This can allow reducing waiting time of the user submitted the given taxi order and hence increasing their customer satisfaction.

More specifically, in accordance with a first broad aspect of the present technology, there is provided a computer-implemented method of assigning vehicles to taxi orders. The method is executable by a processor. The processor is communicatively accessible by the vehicles. The method comprises: during a given order assignment iteration of a plurality of order assignment iterations, executing: receiving, by the processor, an indication of a plurality of taxi orders in a given area; identifying, by the processor, a set of candidate vehicles for assigning among the plurality of taxi orders, a given candidate vehicle of the set of candidate vehicles being associated with a respective estimated time of arrival (ETA) to arrive to a respective location associated with a respective taxi order of the plurality of taxi orders; generating, by the processor, in the set of candidate vehicles, an indication of a model candidate vehicle, the model candidate vehicle being associated with a threshold ETA for the given taxi order; assigning, by the processor, the set of candidate vehicles among the plurality of taxi orders such that an aggregate ETA of respective ETAs associated with each one of the set of candidate vehicles, including the model candidate vehicle, to arrive to respective locations of the respective taxi orders of the plurality of taxi orders is minimized. In response to a given taxi order of the plurality of taxi orders being assigned to the model candidate vehicle, the method further comprises: suspending, by the processor, the given taxi order from being assigned to any one of the set of candidate vehicles during the given order assignment iteration and including, by the processor, the given taxi order in a following plurality of taxi orders to be received during a next order assignment iteration, following the given order assignment iteration of the plurality of order assignment iterations. In response to the given taxi order being assigned to a respective candidate vehicle of the set of candidate vehicles, which is different from the model candidate vehicle, the method further comprises causing, by the processor, dispatching of the respective candidate vehicle to the given taxi order.

In some implementations of the method, prior to the generating the indication of the model candidate vehicle, the method further comprises: for the given candidate vehicle, determining, by the processor, a respective score indicative of vehicle features associated with the given candidate vehicle; applying, by the processor, the respective score to the respective ETA to determine a respective modified ETA for the given candidate vehicle; and wherein: the assigning the set of candidate vehicles among the plurality of taxi orders is based on respective modified ETAs associated with each one of the set of candidate vehicles.

In some implementations of the method, the vehicle features of the given candidate vehicle comprise at least one of: (i) a safety parameter associated with the given candidate vehicle; (ii) a number of candidate vehicles in the set of candidate vehicles; and (iii) product features of the given candidate vehicle.

In some implementations of the method, the safety parameter is indicative of a likelihood value of an accident involving the given candidate vehicle on a route to the respective location associated with the respective taxi order.

In some implementations of the method, wherein the method further comprises determining, by the processor, the safety parameter associated with the given candidate vehicle based on at least one of: (i) a driver security score of a driver of the given candidate vehicle; and (ii) route security score associated with the route to the respective location associated with the respective taxi order.

In some implementations of the method, wherein the method further comprises determining the driver security score based at least on one of: (i) driver-specific features of the driver; (ii) a driving experience of the driver; (iii) a driving style of the driver; (iv) a number of past accidents of the driver; and (v) a traffic rule compliance rate associated with the driver.

In some implementations of the method, the product features of the given candidate vehicle comprise at least one of: a brand and a model of the given candidate vehicle; an issue year of the given candidate vehicle; a volume of a trunk of the given candidate vehicle; and a presence of a child seat in the given candidate vehicle.

In some implementations of the method, further to the including the given taxi order in the following plurality of taxi orders, the method comprises increasing, by the processor, the threshold ETA for the given taxi order for the next order assignment iteration.

In some implementations of the method, the increasing the threshold ETA comprises increasing the threshold ETA such that the greater a buffer time period until the including the given taxi order in the following plurality of taxi orders is, the greater the threshold ETA for the given taxi order for the next order assignment iteration is.

In some implementations of the method, the increasing the threshold ETA comprises increasing the threshold ETA exponentially with respect to the buffer time period.

In some implementations of the method, the increasing the threshold ETA is executed in accordance with an equation:

$$thershold\ ETA = d + a \cdot e^{b+c \cdot buffer\ period\ time},$$

where d is an initial value of the threshold ETA prior to the increasing;
buffer period time is the buffer period time until the including the given taxi order in the following plurality of taxi orders; and
a, b, and c are constant coefficients.

In some implementations of the method, the method further comprises determining, by the processor, the threshold ETA based on at least one of: environmental conditions in the given area; and respective ETAs of each one of the set of the candidate vehicles.

In some implementations of the method, prior to the increasing the threshold ETA for the given taxi order, the threshold ETA is the same for each one of the plurality of taxi orders in the given area.

In some implementations of the method, the threshold ETA is different for taxi orders in an other area, geographically different from the given area.

In some implementations of the method, the threshold ETA for geographically different areas is the same.

In accordance with a second broad aspect of the present technology, there is provided a server for assigning vehicles to taxi orders. The server includes a processor and a non-transitory computer-readable memory storing instructions. The processor, upon executing the instructions, is configured to: during a given order assignment iteration of a plurality of order assignment iterations, execute: receiving an indication of a plurality of taxi orders in a given area; identifying a set of candidate vehicles for assigning among the plurality of taxi orders, a given candidate vehicle of the set of candidate vehicles being associated with a respective estimated time of arrival (ETA) to arrive to a respective location associated with a respective taxi order of the plurality of taxi orders; generating, in the set of candidate vehicles, an indication of a model candidate vehicle, the model candidate vehicle being associated with a threshold ETA for the given taxi order; assigning the set of candidate vehicles among the plurality of taxi orders such that an aggregate ETA of respective ETAs associated with each one of the set of candidate vehicles, including the model candidate vehicle, to arrive to respective locations of the respective taxi orders of the plurality of taxi orders is minimized; in response to a given taxi order of the plurality of taxi orders being assigned to the model candidate vehicle: suspending the given taxi order from being assigned to any one of the set of candidate vehicles during the given order assignment iteration; including the given taxi order in a following plurality of taxi orders to be received during a next order assignment iteration, following the given order assignment iteration of the plurality of order assignment iterations; and in response to the given taxi order being assigned to a respective candidate vehicle of the set of candidate vehicles, which is different from the model candidate vehicle, causing dispatching the respective candidate vehicle to the given taxi order.

In some implementations of the server, the processor, prior to the generating the indication of the model candidate vehicle, is further configured to: for the given candidate vehicle, determine a respective score indicative of vehicle features associated with the given candidate vehicle; apply the respective score to the respective ETA to determine a respective modified ETA for the given candidate vehicle; and wherein: the assigning the set of candidate vehicles among the plurality of taxi orders is based on respective modified ETAs associated with each one of the set of candidate vehicles.

In some implementations of the server, further to the including the given taxi order in the following plurality of taxi orders, the processor is configured to increase the threshold ETA for the given taxi order for the next order assignment iteration.

In some implementations of the server, the processor is configured to increase the threshold ETA such that the greater a buffer time period until the including the given taxi order in the following plurality of taxi orders is, the greater the threshold ETA for the given taxi order for the next order assignment iteration is.

In some implementations of the server, the processor is configured to increase the threshold ETA exponentially with respect to the buffer time period.

In the context of the present specification, a "server" is a computer program that is running on appropriate hardware and is capable of receiving requests (for example from client devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (for example received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices and client devices, however it is not required to be the case with respect to the present technology. Thus, some (non-limiting) examples of electronic devices include personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices. The use of the expression "an electronic device" does not preclude multiple client devices being used in receiving/sending, carrying out or causing to be carried out any task or request, or the consequences of any task or request, or steps of any method described herein.

In the context of the present specification, "client device" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smart phones, and tablets, as well as network equipment such as routers, switches, and gateways It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "software component" is meant to include software (appropriate to a particular hardware context) that is both necessary and sufficient to achieve the specific function(s) being referenced.

In the context of the present specification, the expression "computer information storage media" (also referred to as "storage media") is intended to include media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first database" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware components, in other cases they may be different software and/or hardware components.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

Figure 1:
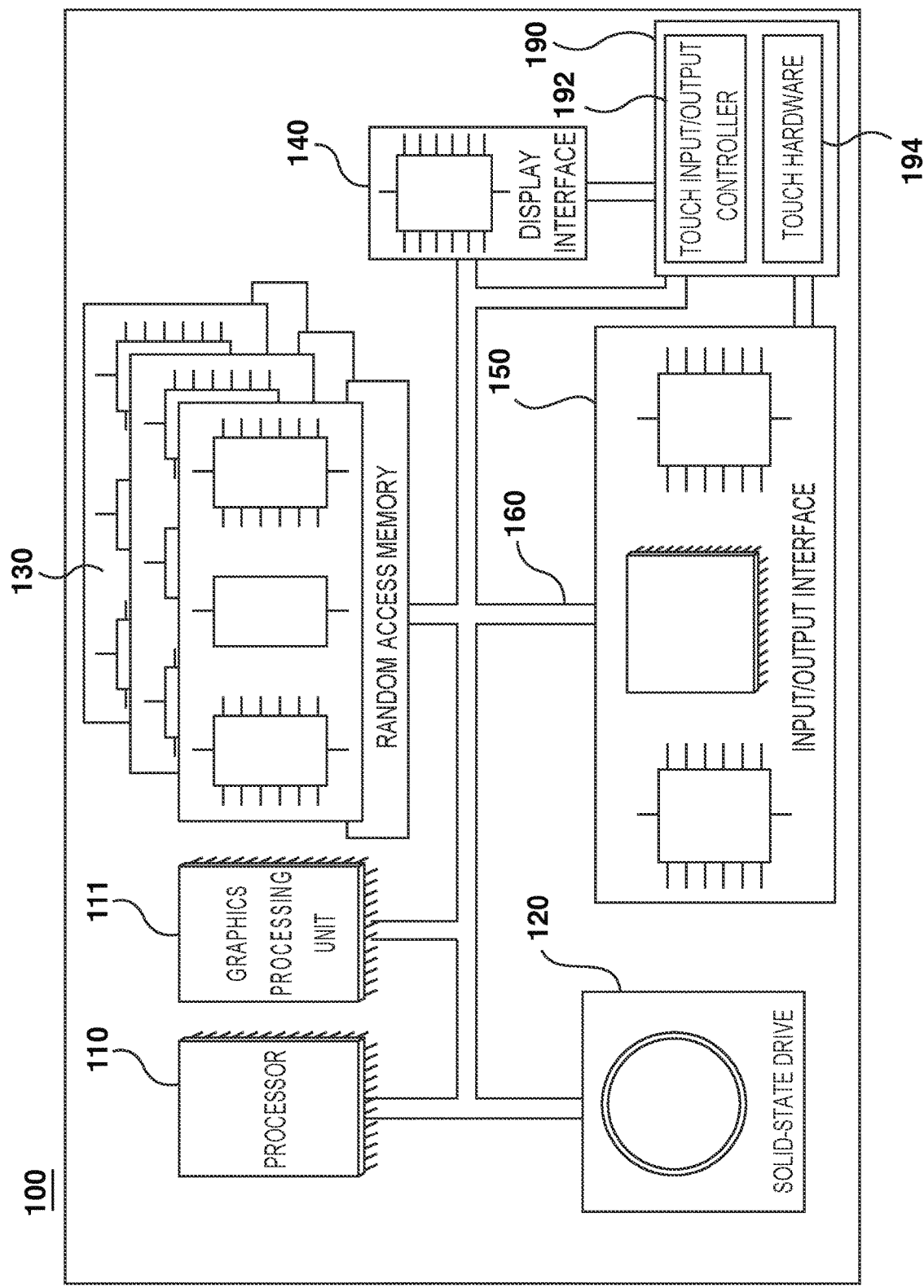
FIG. 1 depicts a schematic diagram of an example computer system configurable for implementing certain non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random-access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

With reference to FIG. 1, there is depicted a computer system 100 suitable for use with some implementations of the present technology. The computer system 100 comprises various hardware components including one or more single- or multi-core processors collectively represented by a processor 110, a graphics processing unit (GPU) 111, a solid-state drive 120, a random-access memory 130, a display interface 140, and an input/output interface 150.

Communication between the various components of the computer system 100 may be enabled by one or more internal and/or external buses 160 (for example, a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may equally be referred to as a screen—such as a screen (not separately labelled) of an electronic device 210 depicted in FIG. 2. In the embodiments illustrated in FIG. 1, the touchscreen 190 comprises touch hardware 194 (for example, pressure-sensitive cells embedded in a layer of a display allowing detection of a physical interaction between a user and the display) and a touch input/output controller 192 allowing communication with the display interface 140 and/or the one or more internal and/or external buses 160. In some non-limiting embodiments of the present technology, the input/output interface 150 may be connected to a keyboard (not separately depicted), a mouse (not separately depicted) or a trackpad (not separately depicted) allowing the user to interact with the computer system 100 in addition to or instead of the touchscreen 190.

It is noted some components of the computer system 100 can be omitted in some non-limiting embodiments of the present technology. For example, the keyboard and the mouse (both not separately depicted) can be omitted, especially (but not limited to) where the computer system 100 is implemented as a compact electronic device, such as a smartphone.

According to implementations of the present technology, the solid-state drive 120 stores program instructions suitable for being loaded into the random-access memory 130 and executed by the processor 110 and/or the GPU 111. For example, the program instructions may be part of a library or an application.

Networked Computing Environment

Figure 2:
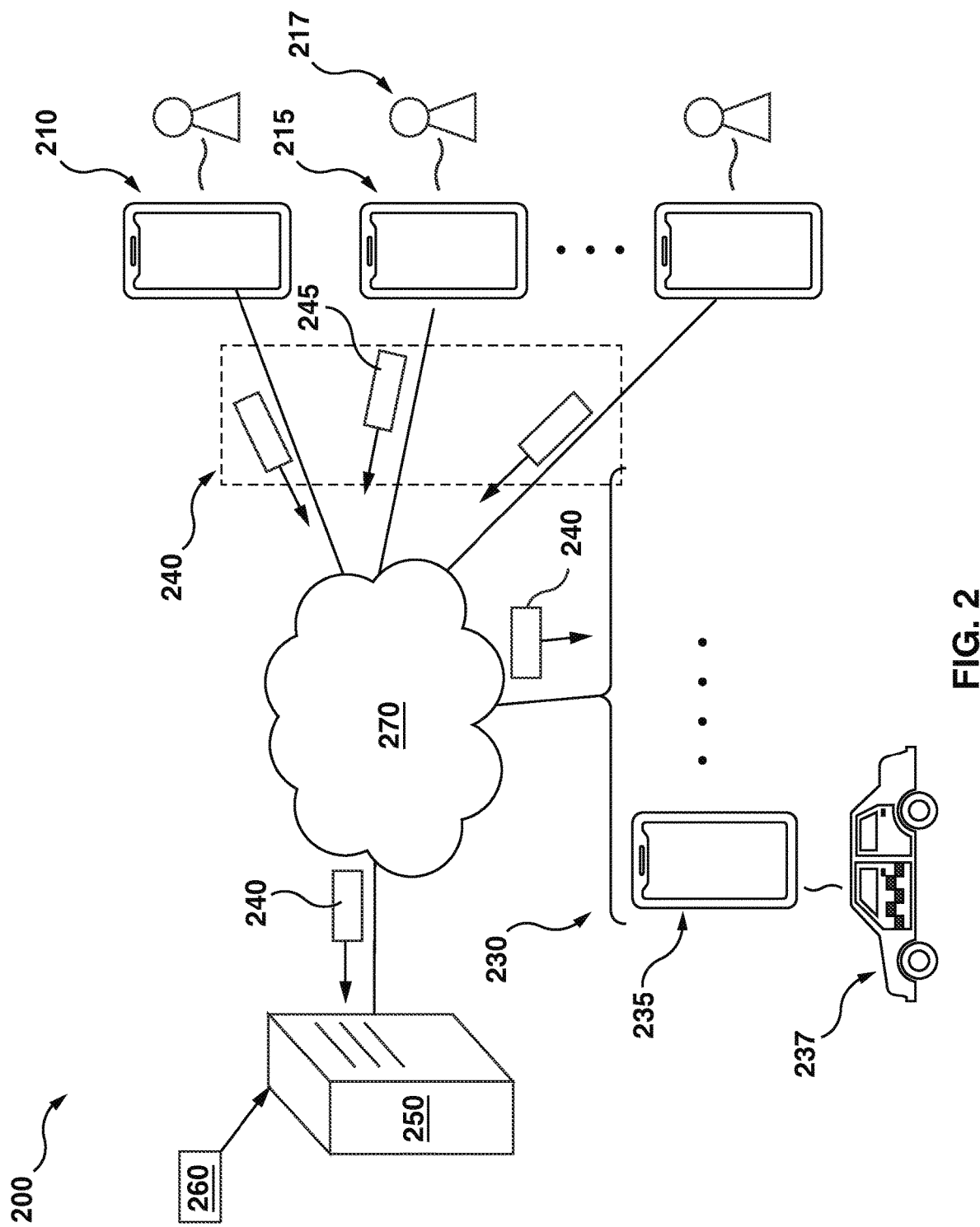
FIG. 2 depicts a schematic diagram of a networked computing environment including the computer system of FIG. 1 and being suitable for use with certain non-limiting embodiments of the present technology.

With reference to FIG. 2, there is depicted a networked computing environment 200 suitable for use with some non-limiting embodiments of the present technology. The networked computing environment 200 includes a server 250 communicatively coupled, via a communication network 270, to (i) a plurality of passenger devices 210, such as a given passenger device 215 associated with a passenger 217; and (ii) a plurality of vehicle devices 230, such as a given vehicle device 235 associated with a vehicle 237.

According to certain non-limiting embodiments of the present technology, the server 250 can be configured to host an online transportation platform 260, accessible by the plurality of passenger devices 210 and the plurality of vehicle devices 230. Broadly speaking, the online transportation platform 260 is a web resource configured to provide ridesharing services to passengers by matching their taxi orders to a plurality of vehicles deployed for the online transportation platform 260, such as the vehicle 237. Non-limiting examples of the online transportation platform 260 include a Uber™ online transportation platform, a Lyft™ online transportation platform, and a Yandex.Taxi™ online transportation platform.

More specifically, in some non-limiting embodiments of the present technology, the online transportation platform 260 can be configured to (i) receive, from the given passenger device 215, an indication of a given taxi order 245 of the passenger 217 to travel from a pick-up location to a drop-off location; and (ii) identify, within a plurality of vehicle (not separately depicted) coupled to the online transportation platform 260 via their respective ones of the plurality of vehicle devices 230, a matching vehicle, such as the vehicle 237, for accommodating the given taxi order 245; and (iii) transmit the indication of the given taxi order 245 to the given vehicle device 235 associated with the vehicle 237, for implementing the given taxi order 245.

More details on how each one of the given passenger device 215, the given vehicle device 235, and the server 250 can be implemented, according to certain non-limiting embodiments of the present technology, will now be described.

Passenger Device

According to certain non-limiting embodiments of the present technology, the given passenger device 215 may include suitable logic, circuitry, interfaces, and/or code, executable by the circuitry, that may be configured to perform one or more operations for submitting the given taxi order 245 to the server 250 for further processing. To that end, the given passenger device 215 can include all or some of the components of the of the computer system 100 of FIG. 1.

More specifically, in some non-limiting embodiments of the present technology, the given passenger device 215 may be configured to run a software application associated with the online transportation platform 260 (such as a passenger application thereof) configured to render various graphical user interfaces (GUIs) enabling the passenger 217 to interact with the online transportation platform 260 for submitting the given taxi order 245. For example, the given passenger device 215 may be configured to display various booking and notification GUIs (not depicted), rendering of which can be caused by the online transportation platform 260. For example, the passenger application of the online transportation platform 260 run by the given passenger device 215 may be configured to display a booking GUI that allows the passenger 217, for example, to: (i) specify the pick-up and drop-off locations; (ii) specify desired vehicle product features associated with the vehicle 237, as well as (iii) give required consents of the passenger 217 for submitting the given taxi order 245.

According to certain non-limiting embodiments of the present technology, the vehicle product features of the vehicle 237 can include, without limitation, (i) a brand and a model of the vehicle 237; (ii) an issue year of the vehicle 237; (iii) a body type of the vehicle 237, such as a sedan, a hatchback, a wagon vehicle, a minivan and others; (iv) a control type of the vehicle 237, such as traditional (operated by a driver) or driverless (also known as a "self-driving vehicle", an "autonomous vehicle"); (v) a volume of a trunk of the vehicle 237 including an available cargo space in the vehicle 237, such as small (less than 3680 litres, for example), medium (between about 3680 and 4500 litres, for example), and large (greater than 4530 litres, for example); (vi) a possibility of travelling with children; a presence of a child seat in the vehicle 237; (vii) a possibility of travelling for passengers with special needs, such as passengers in a wheelchair, elderly passengers, and pregnant women; (viii) and a possibility of travelling with pets.

In some non-limiting embodiments of the present technology, the booking GUI (not depicted) may present a geographical map and a first set of selectable options to the passenger 217. The first set of selectable options may include text boxes, a navigation cursor, a 'ride now' button, a 'ride later' button, a current-location detection button, and a distance scale, and the like. The text boxes may be used by the passenger 217 to enter addresses of the pick-up and drop-off locations, respectively, in a textual format. The navigation cursor may be moved around the geographical map by way of touch-inputs provided by the passenger 217 on the given passenger device 215 and used to pin the pick-up and drop-off locations on the geographical map. The 'ride now' button may be selected by the passenger 217 when the passenger 217 wants to initiate the given taxi order 245 immediately. The 'ride later' button may be selected by the passenger 217 when the passenger 217 wants to initiate the given taxi order 245 at a particular time in future. The current-location detection button, when selected, may move the navigation cursor, to a real-time location of the given passenger device 215. The distance scale may be used by the passenger 217 to zoom in to or zoom out of the geographical map.

Also, according to certain non-limiting embodiments of the present technology, the booking GUI can further be configured to provide the passenger 217 with a second set of options corresponding to the vehicle product features of the vehicle 237. In these embodiments, the second set of features can be implemented as a checkbox menu, as an example.

Further, as mentioned above, the given passenger device 215 may be further configured to communicate, via the communication network 270, the given taxi order 245 to the server 250. Further, the server 250 can be configured to cause the given passenger device 215 to render a GUI presenting to the passenger 217 allocation information received from the server 250 including an indication of a vehicle that is allocated to the given taxi order 245 and an estimated time of arrival (ETA) of that vehicle to arrive at the pick-up location specified in the given taxi order 245.

Vehicle Device

According to certain non-limiting embodiments of the present technology, the given vehicle device 235 associated with the vehicle 237 of the plurality of vehicles can be implemented similarly to the given passenger device 215, and thus can also include all or some of the components of the of the computer system 100 of FIG. 1.

In some non-limiting embodiments of the present technology, the given vehicle device 235 may be configured to run a software application associated with the online transportation platform 260 (such as a driver application thereof) configured to render various GUIs enabling a driver (not depicted) of the vehicle 237 to interact with the online transportation platform 260.

For example, in some non-limiting embodiments of the present technology, in response to the server 250 allocating the vehicle 237 to the given taxi order 245 of the passenger 217, the given vehicle device 235 may be configured to receive order information from the server 250, and render a notification GUI on the display of the given vehicle device 235. The notification GUI may enable the driver of the vehicle 237 to view a message that includes information about the given taxi order 245.

In some non-limiting embodiments of the present technology, the order information about the given taxi order 245 may include a passenger name of the passenger 217, a number of seats required in the given taxi order 245, the pick-up location, the drop-off location, the pick-up time, an estimated drop-off time, a ride fare, and the like. The notification GUI may further include a navigation map showing the pick-up location, the drop-off location, and an estimated route from the pick-up location to the drop-off location. The notification GUI may further include a plurality of options, such as a "confirm booking" option and a "reject booking" option, selectable by the driver of the vehicle 237 upon receiving the order information on the given order 245. The "confirm booking" option may be selected by the driver when the driver wants to confirm the given order 245. The "reject booking" option may be selected by the driver when the driver wants to reject the given order 245. In the latter case, the server 250 may be configured to allocate another vehicle to the given order 245.

Further, based on the allocation information and/or in response to the driver confirming the given taxi order 245, the given vehicle device 235 may be configured to display a navigation GUI to guide the driver of the vehicle 237, thereby causing dispatching of the vehicle 237 to the pick-up location for picking up the passenger 217. The navigation GUI may be further configured to present a route between the pick-up location and the drop-off location to guide the driver of the vehicle 237 to reach the drop-off location from the pick-up location for dropping off the passenger 217. The given vehicle device 235 may be further configured to track a real-time location of the vehicle 237 and communicate information of the tracked real-time location to the server 250. Based on this information, the server 250 can be configured to determine whether the vehicle 237 is (i) currently on duty executing an ongoing taxi order or (ii) is currently available to take the given taxi order 245. The given vehicle device 235 may be further configured to communicate sensor data of one or more sensors (not shown) on the vehicle 235 to the server 250. Examples of the one or more sensors may include, but are not limited to, accelerometer, odometer, traffic sensor, global positioning sensor (GPS), temperature sensor, cameras, or the like.

It should be expressly understood that embodiments where the vehicle 237 is a driverless vehicle, and the given vehicle device 235 is further configured to control operation of the vehicle 237 along a given movement trajectory thereof are also envisioned without departing from the scope of the present technology. In these embodiments, the given vehicle device 235 can be configured to either confirm or reject the given taxi order 245 automatically, based, for example, on a passenger rating of the passenger 217 having submitted the given taxi order 245, a current technical condition of the vehicle 237, a traffic situation, and the like. Also, in these embodiments, the server 250 can be configured to cause dispatching the vehicle 237 to the given taxi order 245 by causing the given vehicle device 235 associated with the vehicle 237 to take control over the vehicle 237 to move along the route to the pick-up location of the given taxi order 245.

Communication Network

In some non-limiting embodiments of the present technology, the communication network 270 is the Internet. In alternative non-limiting embodiments, the communication network 270 can be implemented as any suitable local area network (LAN), wide area network (WAN), a private communication network or the like. It should be expressly understood that implementations of the communication network 270 are for illustration purposes only. How a communication link (not separately numbered) between each one of the given passenger device 215, the given vehicle device 235, and the server 250 and the communication network 270 is implemented will depend inter alia on how each one of the given passenger device 215, the given vehicle device 235, and the server 250 is implemented. Merely as an example and not as a limitation, in those non-limiting embodiments of the present technology where the given passenger device 215 and/or the given vehicle device 235 is implemented as a wireless communication device such as a smartphone or a navigation device, the communication link can be implemented as a wireless communication link. Examples of wireless communication links include, but are not limited to, a 3G communication network link, a 4G communication network link, and the like. The communication network 270 may also use a wireless connection with the server 250.

Server

According to certain non-limiting embodiments of the present technology, the server 250 may include suitable logic, circuitry, interfaces, and/or code, executable by the circuitry, that may be configured to perform one or more operations (for example, execution of programs, routines, scripts, or the like stored in a memory) for vehicle allocation in response to receiving taxi orders of the passengers, such as the given taxi order 245 of the passenger 217. As mentioned herein above, according to certain non-limiting embodiments of the present technology, the server 250 may be configured to receive the given taxi order 245 from the given passenger device 215 over the communication network 270. Based on the given taxi order 245, the server 250 may be configured to select and allocate a suitable vehicle (for example, the vehicle 237) to the given taxi order 245. The server 250 may be further configured to communicate the allocation information to the given passenger device 215 for notifying the passenger 217 of the allocation of the vehicle 237. The server 250 may be realized through various web-based technologies, such as, but not limited to, a Java web-framework, a .NET framework, a PHP (Hypertext Preprocessor) framework, or any other web-application framework.

In some non-limiting embodiments of the present technology, the server 250 can be implemented as a conventional computer server and can thus include all or some of the components of the computer system 100 of FIG. 1. In one non-limiting example, the server 250 is implemented as a Dell™ PowerEdge™ Server running the Microsoft™ Windows Server™ operating system but can also be implemented in any other suitable hardware, software, and/or firmware, or a combination thereof. In the depicted non-limiting embodiments of the present technology, the server 250 is a single server. In alternative non-limiting embodiments of the present technology (not shown), the functionality of the server 250 may be distributed and may be implemented via multiple servers.

In some non-limiting embodiments of the present technology, the server 250 can be operated by the same entity that has provided the online transportation platform 260. For example, if the online transportation platform 260 is the Yandex.Taxi™ online transportation platform, the server 250 can also be operated by Yandex LLC of 16 Lev Tolstoy Street, Moscow, 119021, Russia. In alternative non-limiting embodiments of the present technology, the server 250 can be operated by an entity different from the one that has provided the online transportation platform 260.

In some non-limiting embodiments of the present technology, the given passenger device 215 and/or the given vehicle device 235 can be in communication with the server 250 to receive one or more updates. The updates can be, but are not limited to, software updates of the passenger and driver applications of the online transportation platform 260 run by the given passenger device 215 and the given vehicle device 235, respectively, map updates, routes updates, weather updates, and the like. In some non-limiting embodiments of the present technology, the given passenger device 215 and/or the given vehicle device 235 can also be configured to transmit to the server 250 certain operational data, such as routes travelled, traffic data, performance data, and the like.

Thus, in some non-limiting embodiments of the present technology, the server 250 can be configured to store, in a database thereof, (not depicted) various data used for identifying matching vehicles for executing the taxi orders. More specifically, in some non-limiting embodiments of the present technology, the database of the server 250 may be configured to manage and store (1) historical travel data of passengers (for example, the passenger 217), who have travelled in one or more vehicles of the plurality of vehicles deployed by an entity running the online transportation platform 260, and (2) historical driving data of drivers (for example, the driver of the vehicle 237), who drive respective vehicles of the plurality of vehicles deployed for the online transportation platform 260.

According to various non-limiting embodiments of the present technology, the historical travel data of the passenger 217 may be indicative of details of past taxi orders submitted by the passenger 217 on the vehicles deployed for the online transportation platform 260, in the past. The details of the taxi orders submitted by the passenger 217 may include, without limitation, past pick-up and drop-off locations, respective frequency values of submitting the taxi orders for rides between the historical pick-up and drop-off locations, the desired product vehicle product features that the passenger 217 has specified for the past taxi orders; a rating given to the passenger 217 by the drivers of the online transportation platform 260 after completing each one the past taxi orders, the rating being indicative of driver-satisfaction of the drivers with rides provided to the passenger 217; and the like.

Further, in accordance with certain non-limiting embodiments of the present technology, the historical driving data of a given driver executing taxi orders submitted to the online transportation platform 260, such as the driver of the vehicle 237, may be indicative of details of past taxi orders that have been allocated to the driver of the vehicle 237 by server 250, in the past. The details of the past taxi orders allocated to the driver of the vehicle 237 may include historical pick-up and drop-off locations, duration of each respective ride, working hours of the driver, a rating given to the driver by the passengers of the online transportation platform 260 after executing each of the past taxi orders, the rating being indicative of passenger-satisfaction of the passengers with rides provided by the driver; and the like.

Further, according to certain non-limiting embodiments of the present technology, the database of the server 250 can also be configured to store passenger information of the passengers (for example, the passenger 217) of the online transportation platform 260, driver information of the drivers (for example, the driver of the vehicle 237), and vehicle information of each one of the plurality of vehicles (for example, the vehicle 237) that are deployed for executing the taxi orders submitted to the online transportation platform 260. For example, the passenger information of the passenger 217 may include certain passenger-specific features associated with the passenger 217 further including, without limitation, at least one of: (i) a name of the passenger 217, (ii) a contact number of the passenger 217, (iii) an e-mail address of the passenger 217, (iv) an overall rating of the passenger 217 at the online transportation platform 260, determined, for example, based on ratings of the passenger 217 given by the drivers after completing each of the past taxi orders of the passenger 217, or other related information of the passenger 217.

Further, the driver information of the driver of the vehicle 237 may include (i) certain driver-specific features of the driver of the vehicle 237 further including a name of the driver, a contact number of the driver, an e-mail address of the driver, a gender and an age of the driver, and an identity proof of the driver, for example; and (ii) driver professional features of the driver of the vehicle 237, which may further include, without limitation, at least one of: a driving style of the driver, a number of years of driving (driving record) of the driver; a number of years of driving without accidents (good driving record) of the driver; a number of past accidents, a traffic rules compliance rate associated with the driver, as an example. Also, in those embodiments where the driver owns the vehicle 237 deployed for the online transportation platform 260, the driver information of the driver may further include a vehicle number of the vehicle 237.

According to certain non-limiting embodiments of the present technology, the driving style of the driver can be determined, for example, based on past data on accelerating and braking profile obtained from the vehicle 237 while the driver thereof executed the past taxi orders. The server 250 can be configured to obtain such data from an accelerometer of the vehicle 237 as the driver executed the past taxi orders. Thus, based on such data, the server 250 can be configured to determine the driving style of the driver, for example, as being one of (1) an angry driving style; (2) a reckless and careless driving style; (3) a nervous driving style; and (4) a careful driving style. Further, the traffic rules compliance rate is indicative of how closely the driver of the vehicle 237 follows traffic rules when executing the taxi orders, such as respecting the speed limits, stop signs, rules with respect to parking and halting the vehicles 237 in a given area, for example. The server 250 can be configured to determine the traffic rules compliance rate of the driver by tracking displacements and motion parameters (such as speed and acceleration) of the vehicle 237, obtained from the sensors of the vehicle 237, against roadmap data of routes taken by the driver in the vehicle 237 for executing the past taxi orders.

Finally, the vehicle information of the vehicle 237 may include registered numbers of the vehicle 237, a date of a last maintenance of the vehicle 237, an odometer reading of the vehicle 237, for example, as well as the vehicle product features of the vehicle 237 non-exhaustively listed above.

Furthermore, in some non-limiting embodiments of the present technology, the server 250 may have access (locally and/or remotely) to information indicative of the roadmap. Broadly speaking, the roadmap is a map of roads that are located in a city, a state, and/or other areas, in which the online transportation platform 260 provides the ridesharing services. For example, a section of the roadmap may include information such as, but not limited to: presence of roads in that section, number of lanes on these roads, presence of intersections, and the like.

Further, in some non-limiting embodiments of the present technology, the server 250 may have access (locally and/or remotely) to information indicative of road rules associated with the roadmap. Broadly speaking, road rules represent traffic laws that are determined by a body having jurisdiction and that are applicable on at least some portions of the roadmap. For example, road rules associated with a given section of the roadmap are representative of traffic laws that are applicable for that given section of the roadmap such as, but not limited to: pre-determined direction of traffic flow of each lane in the section of the roadmap, presence of particular road signs governing traffic on that section of the roadmap including stop signs, yield signs, road lane signage, speed limits, indications of other types of traffic laws or rules, and the like.

Also, in some non-limiting embodiments of the present technology, the server 250 can be configured to obtain real-time traffic data on how traffic moves down the roads of the roadmap. According to certain non-limiting embodiments of the present technology, the real-time traffic data can include, without limitation, at least one of: (i) an average speed of the traffic down a given road of the roadmap; (ii) indications of sites of accidents along the given roads, such as accidents between vehicles, those involving pedestrians and animals, and the like; (iii) indications of foreign objects along the given road, such as cargo fallen out from vehicles having driven down the given road, construction cones, killed animals, and the like; (iv) indications of construction works along the given road of the roadmap; (v) indications of presence of the police along the given road; and (vi) a number of available and closed lanes along the given road; and the like. According to certain non-limiting embodiments of the present technology, the server 250 can be configured to determine the real-time traffic data by analysing data from the sensors of the plurality of vehicles and/or the plurality of vehicles devices 230 thereof, such as the GPS sensors of the plurality of vehicles. However, in other non-limiting embodiments of the present technology, the server 250 can be configured to elicit, via the driver application of the online transportation platform 260, the real-time traffic data from the drivers of the plurality of vehicles. In these embodiments, the server 250 can be configured to generate and further output, in the respective ones of the plurality of vehicle devices 230, such as the given vehicle device 235, questions to the drivers regarding a current traffic situation in their vicinity, such as "Is there a jam ahead?" or "Police in 250 m. Not there/Still there?", and the like. Accordingly, the server 250 can be configured to cause the given vehicle device 235 to render a respective interface elements (such as "YES"/"NO" actuators) for the driver to provide answers to the output questions.

Thus, according to certain non-limiting embodiments of the present technology, in response to receiving the given taxi order 245, based on the roadmap data and real-time data from the one or more sensors of each one of the plurality of vehicle and/or the plurality of vehicle device 230 thereof, the server 250 can be configured to: (i) determine a respective ETA of each one of the plurality of vehicles to arrive to the pick-up location associated with the given taxi order 245; and (ii) based on the respective ETAs associated with the plurality of vehicles, determine the matching vehicle to execute the given taxi order 25.

How the server 250 can be configured to determine the matching vehicle for accommodating the taxi orders of the passengers of the online transportation platform 260, such as the given taxi order 245 of the passenger 217, based on the respective ETAs, in accordance with certain non-limiting embodiments of the present technology, will now be described with references to FIGS. 3 to 7.

Assigning Vehicles to Taxi Orders

With continued reference to FIG. 2, according to certain non-limiting embodiments of the present technology, the server 250 can be configured to process the taxi orders by batches—such as a batch of taxi orders 240, including the given taxi order 245, that have been submitted by the passengers by a given moment in time According to certain non-limiting embodiments of the present technology, the server 250 can be configured to receive the batch of taxi orders 240 from a given area where the online transportation platform 260 is configured to provide the ridesharing services. Broadly speaking, the given area can be a territory of a predetermined surface area, such as 5, 10, 25, or even 100 or 300 square kilometers, as an example. In some non-limiting embodiments of the present technology, the given area can comprise a respective administrative division unit in a country where the online transportation platform 260 operates, and can thus include, for example, a block, a district, a town, a city, a region (such as a county, a province, a state, and others), and the like. However, in other non-limiting embodiments of the present technology, the given area can be defined differently, such as having a predetermined shape, including, for example, a square, a rectangle, or a circle of certain dimensions within the roadmap accessible by the server 250. In some non-limiting embodiments of the present technology, the dimensions of the given area can be determined based on various factors, including, without limitation, a density of population residing in the given area; availability of public transport in the given area; a mobility rate of residents in the given area; and others.

Further, according to certain non-limiting embodiments of the present technology, the server 250 can be configured to receive an indication of each batch of taxi order submitted in the given area in iterations defined in time, such as with a predetermined time step. For example, at a given order assignment iteration, the server 250 can be configured to receive a respective batch of taxi orders, such as the batch of taxi orders 240, that has been accumulated over a time equal to the predetermined time step from a moment of terminating a previous order assignment iteration. It is not limited how the predetermined time step can be selected. In some non-limiting embodiments of the present technology, the predetermined time step defining order assignment iterations in the given area can be selected based at least on one of: (i) demographics of the given area, including the surface area and a number of residents thereof; (ii) an average demand for vehicles, that is an average number of taxi orders submitted in a given period, such as a day, a week, a month, and the like; (iii) a number of vehicles of the plurality of vehicles deployed by the online transportation platform 260 available for executing the taxi orders in the given area; and other factors. For example, based on such factors, the predetermined time step can be selected as being from 30 seconds to 20 minutes.

In some non-limiting embodiments of the present technology, the predetermined time step for the given area can be constant at all times. However, in other non-limiting embodiments of the present technology, the predetermined time step can be variable. For example, the predetermined time step can take different values depending on time of day, such that during peak hours (such as from 7:00 am to 9:00 am and 4:00 μm to 7 μm), the predetermined time step can be shorter than during the rest of the day. In another example, the predetermined time step can vary depending on days of the week, such that, for example, during the weekdays, the predetermined time step can be shorter than during the weekend and public holidays. In yet other example, the predetermined time step can vary depending on a particular season, such that, for example, during the wintertime, the predetermined time step can be shorter than during other seasons.

Thus, having received, at the given order assignment iteration, the indication of the batch of taxi orders 240 in the given area, according to certain non-limiting embodiments of the present technology, the server 250 can be configured to: (i) identify a set of candidate vehicles currently available in the given area; (ii) determine, for each one of the set of candidate vehicles, respective ETAs thereof to arrive to respective pick-up locations associated with each of the batch of taxi orders 240, such as the given taxi order 245; (iii) based one the respective ETAs, assign the set of candidate vehicles among the batch of taxi orders 240; and (iv) based on this assignment, cause dispatching of each one of the set of candidate vehicles to the respective one of the batch of taxi orders 240. In some non-limiting embodiments of the present technology, the server 250 can be configured to determine the respective ETA of a given one of the set of candidate vehicles as being minimum possible ETA, that is, associated with a fastest route to the pick-up location of the given taxi order 245, based on the real-time traffic data in the given area.

Also, it is not limited how the server 250 can be configured to process those of the batch of taxi orders 240 that have not been assigned to any one of the set of candidate vehicles during the given order assignment iteration, such as due to a number of vehicles in the set of candidate vehicles at the given order assignment iteration being insufficient to accommodate all of the batch of taxi orders 240. In one example, the server 250 can be configured to transfer remaining taxi orders to a next order assignment iteration, following the given order assignment iteration. However, in another example, the server 250 can be configured to cancel all outstanding taxi orders of the batch of taxi orders 240, not assigned to any vehicle during the given order assignment iteration.

According to certain non-limiting embodiments of the present technology, the server 250 can be configured distribute the set of candidate vehicles among the batch of taxi orders 240 such that an aggregate ETA, determined as a sum of respective ETAs of each one of the set of candidate vehicles to arrive at the respective one of the batch of taxi orders 240, is minimized.

Figure 3:
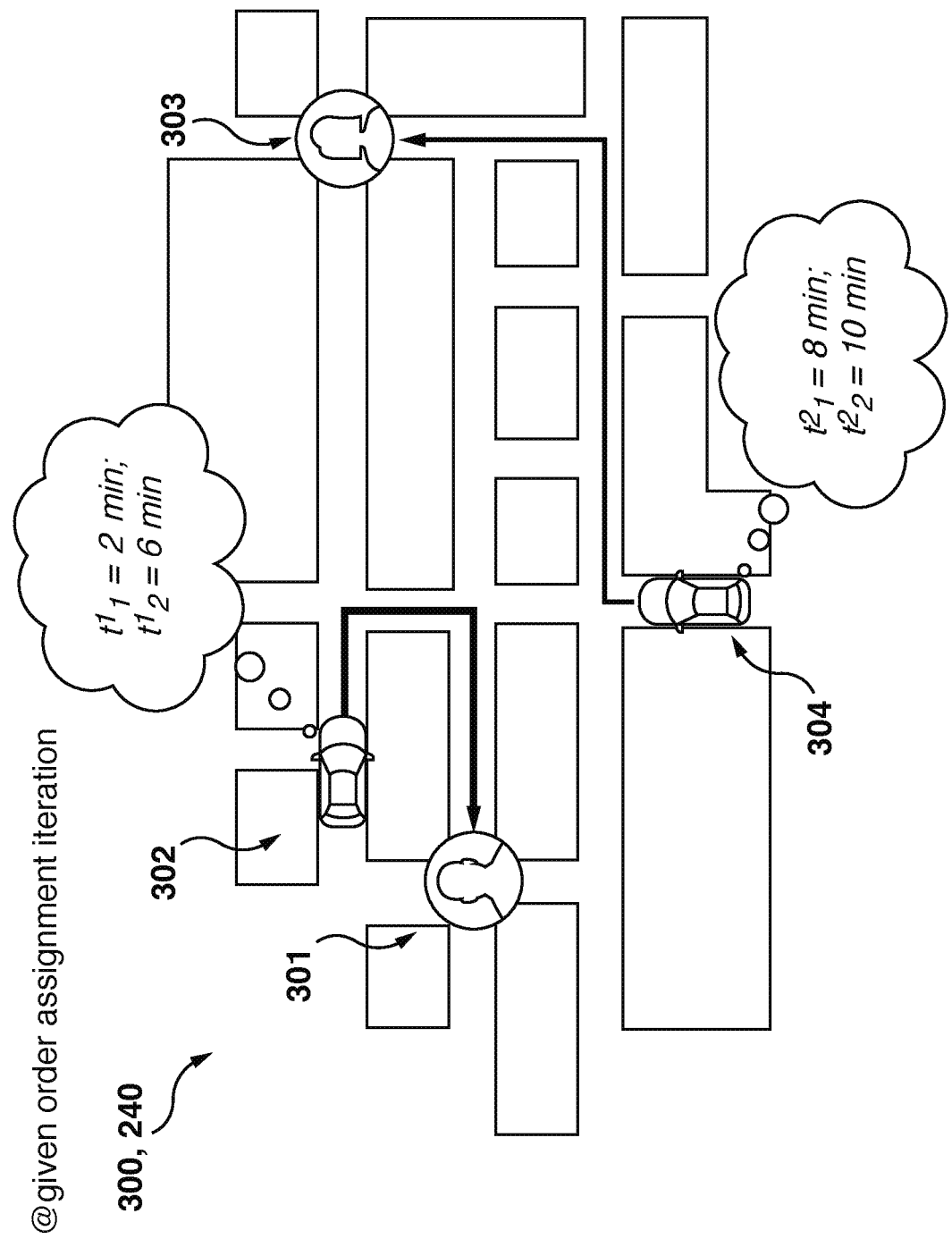
FIG. 3 depicts a roadmap section of a given area illustrating an example approach to assigning, by a server of the networked computing environment of FIG. 2, vehicles to taxi orders at a given order assignment iteration, in accordance with certain non-limiting embodiments of the present technology.

With reference to FIG. 3, there is depicted a roadmap section 300 corresponding to the given area during the given order assignment iteration schematically illustrating a given example of assigning the set of candidate vehicles among the batch of taxi orders 240 based on the minimized aggregate ETA, in accordance with certain non-limiting embodiments of the present technology.

In the embodiments depicted in FIG. 3, at the given order assignment iteration in the given area, the batch of taxi orders 240 includes a first taxi order submitted by a first passenger 301 and a second taxi order submitted by a second passenger 303. To that end, the server 250 could be configured to identify, in the plurality of vehicles, the set of candidate vehicles available in the given area to accommodate the batch of taxi orders 240, the set of candidate vehicles including a first candidate vehicle 302 and a second candidate vehicle 304. Needless to say, that each one of the first and second candidate vehicles 302, 304 can be implemented similarly to the vehicles 237 described above.

Thus, as mentioned above, the server 250 can be configured to determine for each of the first and second vehicle 302, 304, the respective ETAs to arrive to associated pick-up locations (not separately numbered) of each of the first and second taxi orders. More specifically, the server 250 could be configured to determine, based on the roadmap data and real-time traffic data described above, that the first candidate vehicle 302 can arrive (i) at the respective pick-up location of the first taxi order within the respective ETA $t^1_1=2$ min; and (ii) at the respective pick-up location of the second taxi order within the respective ETA $t^1_2=6$ min. Similarly, the server 250 could be configured be configured to determine that the second candidate vehicle 304 can arrive (i) at the respective pick-up location of the first taxi order within the respective ETA $t^2_1=8$ min; and (ii) at the respective pick-up location of the second taxi order within the respective ETA $t^2_2=10$ min.

Thus, by minimizing the aggregate ETA of the first and second vehicle 302, 304, the server 250 can be configured to assign the first candidate vehicle 302 to the first taxi order, and the second candidate vehicle 304 to the second taxi order, as indicated by bold direction arrows in FIG. 3. As it can be appreciated, in this case, the aggregate ETA, which is equal to 12 min, is minimum among all possible combinations between the respective ETAs for picking up each one of the first and second passenger 301, 303.

In some non-limiting embodiments of the present technology, for pairing up each one of the set of candidate vehicles with a respective one of the batch of taxi orders 240 such that the aggregate ETA is minimized, the server 250 can be configured to execute an optimization algorithm. It is not limited how the optimization algorithm can be implemented; and in some non-limiting embodiments of the present technology, the optimization algorithm can include a combinatorial optimization algorithm, such as, a Hungarian optimization algorithm, as an example. It should be expressly understood that use of other optimization algorithms for minimizing the aggregate ETA is also envisioned without departing from the scope of the present technology.

Further, according to certain non-limiting embodiments of the present technology, the server 250 can be configured to modify the respective ETA of the given candidate vehicle of the set of candidate vehicles to arrive at the pick-up location of the given one of the batch of taxi orders 240 based on vehicle features associated with the given candidate vehicle, such as one of the first and second candidate vehicles 302, 304. More specifically, according to certain non-limiting embodiments of the present technology, the server 250 can be configured to: (i) determine, based on the vehicle features associated with the given candidate vehicle, a respective vehicle score; and (ii) apply the respective vehicle score to the respective ETA of the given candidate vehicle for the given one of the batch of taxi orders 240 to determine a respective modified ETA.

According to certain non-limiting embodiments of the present technology, the vehicle features can include, without limitation at least one of: (i) a safety parameter associated with the given candidate vehicle for taking the given one of the batch of taxi orders 240; (ii) a number of candidate vehicles in the set of candidate vehicles available during the current order assignment iteration; and (iii) desired vehicle product features, mentioned above with respect to the vehicle 237, specified in the given one of the batch of taxi orders 240.

According to certain non-limiting embodiments of the present technology, the safety parameter associated with the given candidate vehicle is indicative of a likelihood value of an accident involving the given candidate vehicle on a given route, such as the route to at least one of the respective pick-up location and the respective drop-off location associated with the given one of the batch of taxi orders 240. In various non-limiting embodiments of the present technology, the server 250 can be configured to determine the safety parameter based on at least one of: (i) the driver information of the given candidate vehicle, as described above with respect with the driver of the vehicle 237; (ii) route information of the route to at least one of the respective pick-up location and the respective drop-off location associated with the given one of the batch of taxi orders 240.

According to certain non-limiting embodiments of the present technology, the route information about the given route within the roadmap can include at least one of: (i) an average speed value on the given route; (ii) an average number of lanes along the given route; (iii) an average bandwidth of the given route, which can be expressed, for example, in a number of vehicles passing along the given route a day; (iv) a route length of the given route; and (v) a number of accidents occurred on the given route in a predetermined period, such as a week, a month, or a year.

More specifically, to determine the safety parameter associated with the given route, in some non-limiting embodiments of the present technology, the server 250 can be configured to determine: (i) based on the driver information associated with the driver of the given candidate vehicle, a driver security score associated with the driver of the given candidate vehicle; (ii) based on the route information associated with the given route, a route security score associated with the given route; and (iii) determine, based on, on the driver security score and the route security score, the likelihood value of accident involving the given candidate vehicle on the route the at least one of the respective pick-up location and the respective drop-off location associated with the given one of the batch of taxi orders 240.

It is not limited how the server 250 can be configured to determine each one of the driver security score and the route security score based on the above data as well as determine the likelihood value of accident; and in some non-limiting embodiments of the present technology, the server 250 can be configured to apply a machine-learning approach as described in a co-owned U.S. patent application, filed with the United States Patent and Trademark Office concurrently with the present application, entitled "METHODS AND SERVERS FOR GENERATING A PREDICTION SCORE BY A MACHINE LEARNING ALGORITHM", (U.S. patent application Ser. No. 18/241,834), the content of which is incorporated herein by reference in its entirety.

Further, in some non-limiting embodiments of the present technology, to determine the respective vehicle score, the server 250 can be configured to: (i) compare a respective individual value of a given vehicle feature with a respective predetermined feature threshold value; and (ii) based on this comparison, increase or decrease the respective vehicle score of the given candidate vehicle by a predetermined incremental value, such as 1, 5, or 10, as an example.

For example, if the server 250 has determined that the safety parameter associated with the given candidate vehicle on the respective route is 0.7 given that the respective predetermined feature threshold value for the safety parameter has been selected to be 0.5, the server 250 can be configured to decrease the respective vehicle score of the given candidate vehicle by the predetermined incremental value. In another example, if, at the given order assignment iteration, the set of candidate vehicles includes two candidate vehicles given that the respective threshold feature value for the number of candidate vehicles has been selected to be 5, the server 250 can be configured to increase the respective vehicle score of the given candidate vehicle by the predetermined incremental value. In yet other example, if a given passenger, such as one of the first and second passengers 301, 303, has specified a presence of a child seat as a desired vehicle product feature for their taxi order, and the given candidate vehicle does not offer this feature, the server 250 can the server 250 can be configured to decrease the respective vehicle score of the given candidate vehicle by the predetermined incremental value.

Also, in some non-limiting embodiments of the present technology, the server 250 can be configured to apply the predetermined incremental value for a given vehicle feature of the vehicle features with a respective weight coefficient, thereby prioritizing or penalizing the given vehicle feature when determining the respective vehicle score of the given candidate vehicle. For example, the server 250 can be configured to decrease the respective vehicle score of the given candidate vehicle by the predetermined incremental value taken with the respective weight coefficient of 2, if the safety parameter for the given candidate vehicle on the respective route is greater than the respective predetermined feature threshold value. In another example, the server 250 can be configured to increase the respective vehicle score of the given candidate vehicle by the predetermined incremental value taken with the respective weight coefficient of 1.5, if the given candidate vehicle has all the desired vehicle product features specified in the given one of the batch of taxi orders 240, such as the presence of the child seat or a large volume of the trunk, as an example. Further, in some non-limiting embodiments of the present technology, the server 250 can be configured to normalize the respective vehicle score to a predetermined time scale by applying to the respective vehicle score a respective coefficient, thereby converting the respective vehicle score in time units.

Further, the server 250 can be configured to apply the respective vehicle score to the respective ETA of the given candidate vehicle for the given one of the batch of taxi orders 240 with an opposite sign. More specifically, if the respective vehicle score is negative, the server 250 is configured to increase the respective ETA of the given candidate vehicle for the given one of the batch of taxi order; else, the server 250 can be configured to decrease the respective ETA.

In some non-limiting embodiments of the present technology, the server 250 can be configured to apply the respective vehicle score to the respective ETA of the given vehicle candidate in accordance with a following equation:

$$ETA^M = (1-a) \cdot ETA + ab \cdot disctance\text{-score}, \quad \text{(Equation 1)}$$

where $ETA^M$ is a respective modified ETA of the given candidate vehicle resulting from applying thereto the respective vehicle score;
ETA is the respective (initial) ETA of the given candidate vehicle to arrive at the respective pick-up location of the given one of the batch of taxi orders 240;
distance is a distance value to the respective pick-up location;
score is the respective vehicle score in time units (such as seconds); and
a, b are coefficients.

Figure 4:
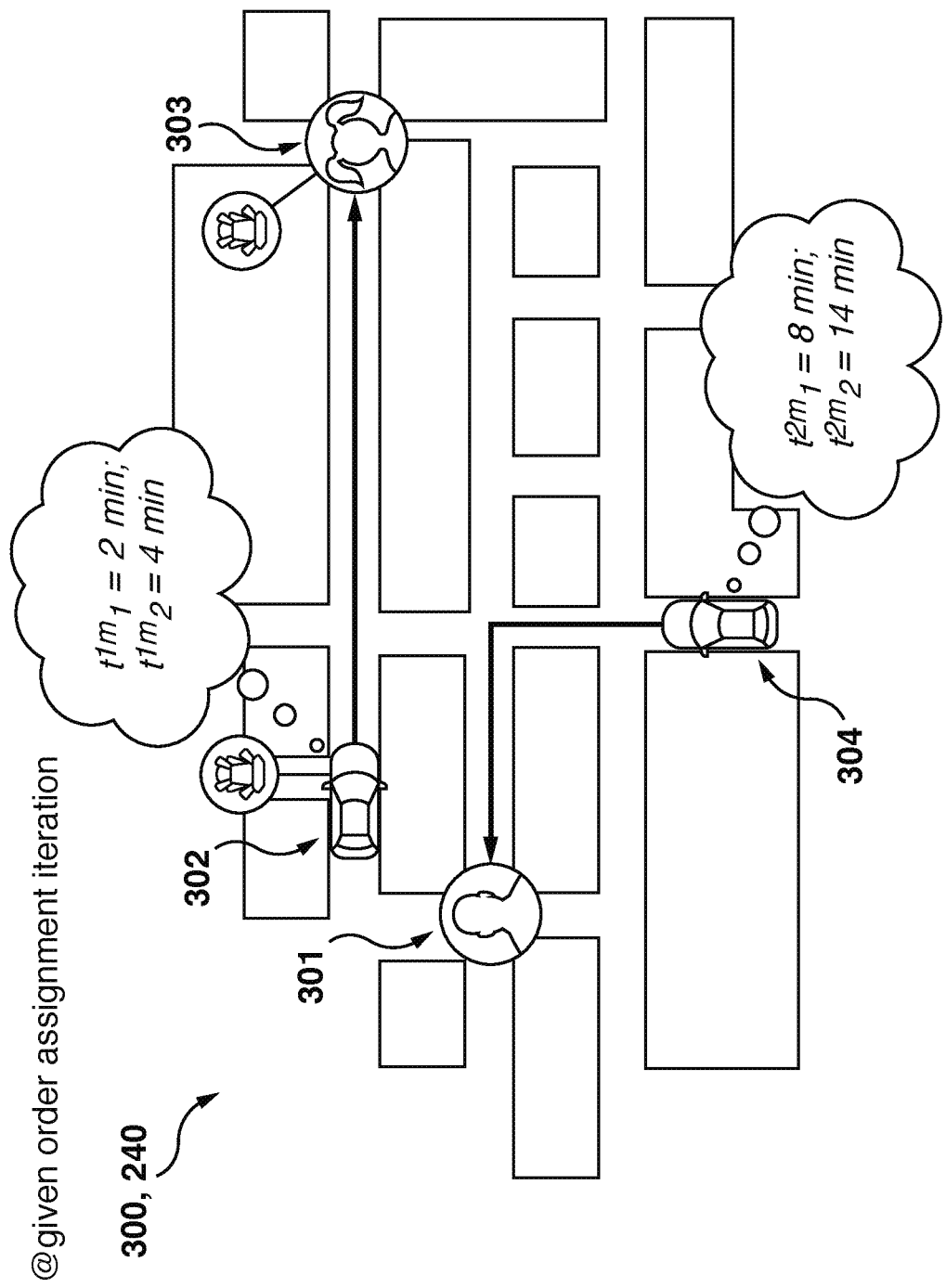
FIG. 4 depicts the roadmap section of the given area illustrating an other example approach to assigning, by the server of the networked computing environment of FIG. 2, vehicles to taxi orders at the given order assignment iteration, in accordance with certain non-limiting embodiments of the present technology.

With reference to FIG. 4, there is depicted the roadmap section 300 corresponding to the given area during the given order assignment iteration schematically illustrating another example of assigning the set of candidate vehicles among the batch of taxi orders 240 based on the minimized aggregate ETA, in accordance with certain non-limiting embodiments of the present technology.

As it can be appreciated, the example of FIG. 4 is different from that of FIG. 3 in that in the former the server 250 is configured to assign the set of candidate vehicles among the batch of taxi orders 240 based on respective modified ETAs, determined as described above. More specifically, since the first candidate vehicle 302 has a desired vehicle product feature of the child seat specified by the second passenger 303 in the second taxi order, the server 250 can be configured to decrease the respective ETA of the first candidate vehicle 302 for this taxi order, $t^2_2=6$ min, to the respective modified ETA, $t^{lm}_2=4$ min, leaving its respective ETA for the first taxi order unchanged. Further, since the second candidate vehicle 304 does not offer the desired vehicle product feature of the child seat specified by the second passenger 303, the server 250 can be configured to increase the respective ETA of the second candidate vehicle 304 for this taxi order, $t^2_2=10$ min, to the respective modified ETA, $t^{2m}_2=14$ min, leaving its respective ETA for the first taxi order unchanged.

Thus, as it can be appreciated, by minimizing the aggregate ETA, executing the optimization algorithm, as described above, the server 250 can be configured to assign, during the given order assignment iteration, (1) the first candidate vehicle 302 to the second taxi order of the batch of taxi orders 240; and (2) the second candidate vehicle 304 to the first taxi order of the batch of taxi orders 240.

By doing so, when pairing up candidate vehicles with the respective taxi orders, the server 250 can be configured to prioritize vehicles having specific features for the taxi orders requiring such features and/or prioritize those vehicles for taxi orders, in general, that are associated with a lesser risk of being involved in an accident while executing the given taxi order. Thus, certain non-limiting embodiments of the present technology allow increasing the customer satisfaction of the passengers of the online transportation platform 260 as well as overall safety of the ridesharing services provided thereby.

It should be expressly understood that, in some non-limiting embodiments of the present technology, the respective modified ETA of the given candidate vehicle, aside from the time units, can also be expressed in other units, such as dimensionless units, and in certain cases can be negative. In these embodiments, after minimizing the aggerate ETA, determined based on respective modified ETAs, to assign the set of candidate vehicles among the batch of taxi orders 240, the server 250 can further be configured to assign each one of the set of candidate vehicles back with their respective ETAs initially, determined as described above.

Also, the developers of the present technology have appreciated that in some cases it may be advantageous not to assign all of the batch of taxi orders 240 during the given order assignment iteration even the set of candidate vehicles has a sufficient number of candidate vehicles. More specifically, certain non-limiting embodiments of the present technology are directed to suspending those of the batch of taxi order 240 that cannot be accommodated by any one of the set of candidate vehicles within a predetermined threshold ETA. By doing so, the present methods, while suspending taxi orders that have been left unassigned from the given order assignment iteration, allow certain time for an organic change in coverage of the given area with available vehicles, which may further allow identifying, for the unassigned taxi order, during the next order assignment iteration, a candidate vehicle having a respective ETA for that taxi order that is less than the predetermined ETA threshold. By doing so, certain non-limiting embodiments of the present technology may allow reducing waiting time of passengers for vehicles to execute their taxi orders.

To that end, in some non-limiting embodiments of the present technology, at the given order assignment iteration, the server 250 can be configured to generate, in the set of candidate vehicles available at the given order assignment iteration, an indication of a respective model candidate vehicle, that is, a virtual vehicle having desired vehicle driving features, such as the predetermined threshold ETA for arriving to respective pick-up locations associated with each one of the batch of taxi orders 240.

Figure 5:
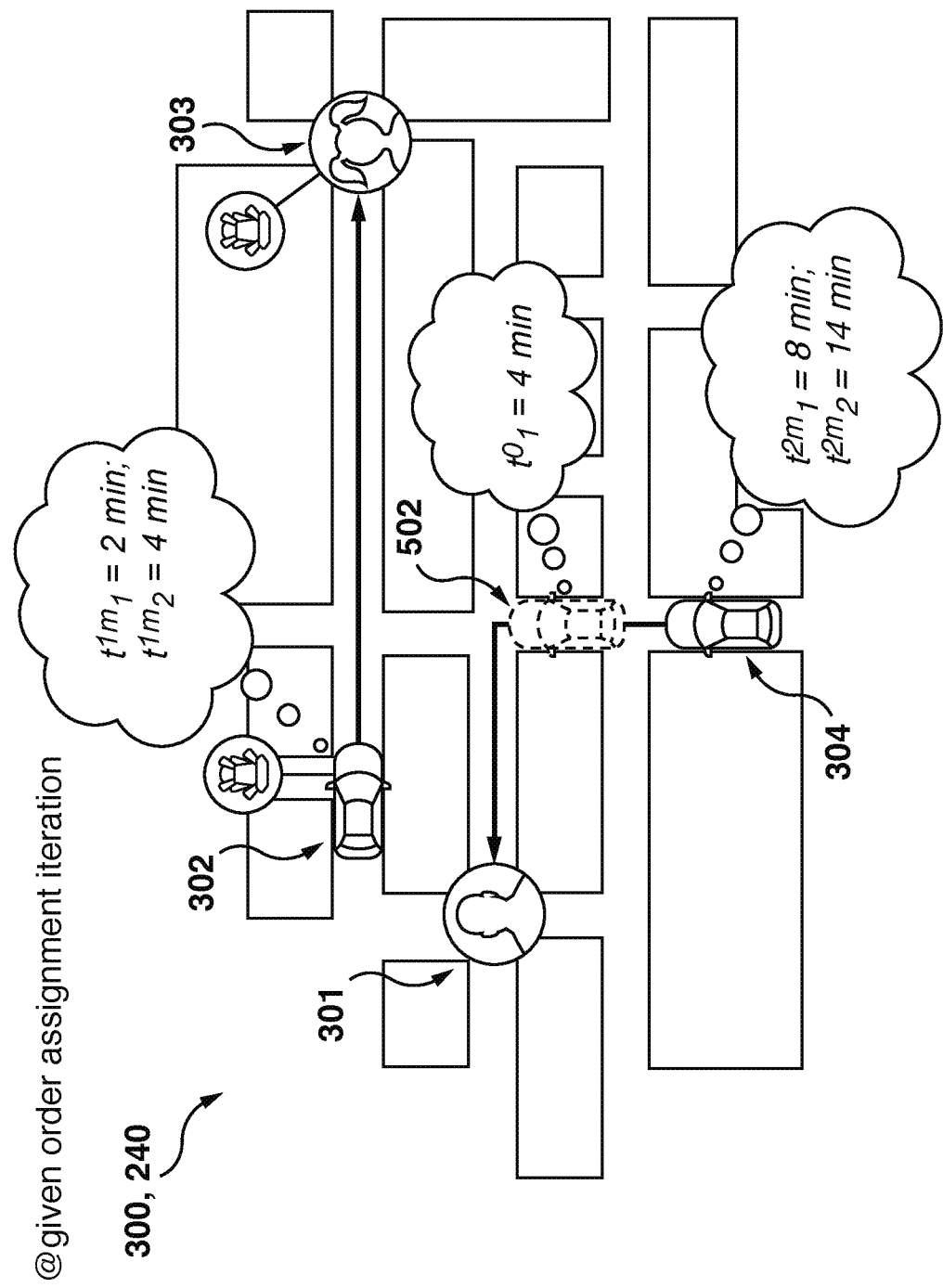
FIG. 5 depicts the roadmap section of the given area illustrating yet other example approach to assigning, by the server of the networked computing environment of FIG. 2, vehicles to taxi orders at the given order assignment iteration, in accordance with certain non-limiting embodiments of the present technology.

With reference to FIG. 5, there is depicted the roadmap section 300 corresponding to the given area during the given order assignment iteration schematically illustrating yet other example of assigning the set of candidate vehicles, including a model candidate vehicle 502, among the batch of taxi orders 240 based on the minimized aggregate ETA, in accordance with certain non-limiting embodiments of the present technology.

As it can be appreciated, the server 250 can be configured to generate, for the first taxi order of the batch of taxi orders 240, the indication of the model candidate vehicle 502 such that its respective ETAs to arrive at the respective location of the first taxi order corresponds to the predetermined threshold ETA to pick up the first passenger 301, which, in the example of FIG. 5, equals 4 min.

According to certain non-limiting embodiments of the present technology, the predetermined threshold ETA can be selected based on parameters of the given area, such as, without limitation, (i) the demographics of the given area; (ii) the average vehicle demand therein; (iii) a number of vehicles deployed by the online transportation platform 260 in the given area; (iv) current environmental conditions in the given area, such as weather, a level of air pollution, time of day, and others; (v) the respective ETAs and/or respective modified ETAs of each one of the set of candidate vehicles, as described above; (vi) certain marketing considerations; and the like. For example, if a level of visibility in then given area is reduced due to the current environmental conditions, such as snow or smog, for example, the predetermined threshold ETA can be increased. In another example, the predetermined threshold ETA can be selected for the given one of the batch of taxi orders 240 based on an average respective ETA of the set of candidate vehicles for the given one of the batch of taxi orders 240.

Thus, depending on at least some of these factors, the predetermined threshold ETA can be selected, for the given area, as being 3, 4, 5, or 10 min, for example. Thus, in some non-limiting embodiments of the present technology, for some geographically different areas covered by the ridesharing services of the online transportation platform 260, the predetermined threshold ETA can be different. By way of example, in those embodiments where the given area is a city, the predetermined threshold ETA for picking up the given passenger in Moscow can be 5 min, whereas in Montreal, a city smaller than Moscow, the predetermine threshold ETA can be 3 min, for example. However, embodiments where the predetermined threshold ETA for geographically different areas is the same are also envisioned without departing from the scope of the present technology.

Also, in some non-limiting embodiments of the present technology, each one of the batch of taxi orders 240 in the given area can be associated with a respective individual threshold ETA; and the server 250 can be configured to generate, in the set of candidate vehicles, a respective individual model candidate vehicle associated with the respective individual threshold ETA to arrive at the pick-up location of the given one of the batch of taxi orders 240.

Thus, continuing with the example of FIG. 5, minimizing the aggregate ETA using the optimization algorithm, as described above, the server 250 can be configured to assign (i) the first candidate vehicle 302 to the second taxi order of the batch of taxi orders 240, of the second passenger 303; and (ii) the model candidate vehicle 502 to the first taxi order of the batch of taxi orders 240, of the first passenger 301.

Further, once the server 250 has assigned the first taxi order to the model candidate vehicle 502, according to certain non-limiting embodiments of the present technology, the server 250 can further be configured to suspend the first taxi order from assigning to any one of the set of candidate vehicles during the given order assignment iteration until the next order assignment iteration, following thereafter. Further, during the next order assignment iteration, the server 250 can be configured to (1) include the first taxi order, left unassigned from the given order assignment iteration, to a following batch of taxi orders, having been accumulated by the next order assignment iteration; and (2) identify a respective actual vehicle for the first taxi order in a similar fashion as described above. As it can be appreciated, if during the next order assignment iteration, the server 250 fails to assign the first taxi order to the respective actual vehicle assigning the first taxi order to the model candidate vehicle 502 again, the server 250 can be configured to suspend the first taxi order from assigning to any vehicle during the next order assignment iteration and transfer the first taxi order to a further next order assignment iteration, following the next order assignment iteration.

However, in some non-limiting embodiments of the present technology, to increase a likelihood of the first taxi order, left from the given order assignment iteration, being assigned to the respective actual vehicle during a given next order assignment iteration, the server 250 can be configured, further to including the first taxi order to the following batch of taxi orders, increase the predetermined threshold ETA of the model candidate vehicle 502. According to certain non-limiting embodiments of the present technology, the server 250 can be configured to increase the predetermined threshold ETA based on a buffer period time until including the first taxi order to the following batch of taxi order. For example, in some non-limiting embodiments of the present technology, for each next order assignment iteration, the server 250 can be configured to increase the predetermined threshold ETA of the model candidate vehicle 502 by a predetermined incremental value, such as 1, 2, or 5 min, as an example. In another example, for each next order assignment iteration, the server 250 can be configured to increase the predetermined threshold ETA of the model candidate vehicle 502 a predetermined multiplier times, such as 1.5, 2.0, or 3.0, as an example.

However, in accordance with certain non-limiting embodiments of the present technology, the server 250 can be configured to increase the predetermined threshold ETA exponentially with respect to the buffer period time until including the first taxi order, left unassigned from the given order assignment iteration, to the following batch of taxi order, received at the next order assignment iteration. More specifically, in these embodiments, the server 250 can be configured to increase the predetermined threshold ETA in accordance with an equation:

$$thershold\ ETA = d + a \cdot e^{b+c \cdot buffer\ period\ time}, \quad \text{(Equation 2)}$$

where d is an initial value of the predetermined threshold ETA prior to the increasing, which in the example of FIG. 5, is 4 min;

buffer period time is the buffer period time until the server 250 includes the first taxi order in the following batch of taxi orders; and a, b, and c are constant coefficients.

According to certain non-limiting embodiments of the present technology, each one of the constant coefficients can be determined empirically, for example, such that the first taxi order, left unassigned from the given order assignment iteration, would be assigned within a certain number of next order assignment iterations with a predetermined likelihood value. In another example, the server 250 can be configured to modulate the constant coefficients online based, for example, on the real-time traffic data, received by the server 250, from the given area, as described above.

Figure 6:
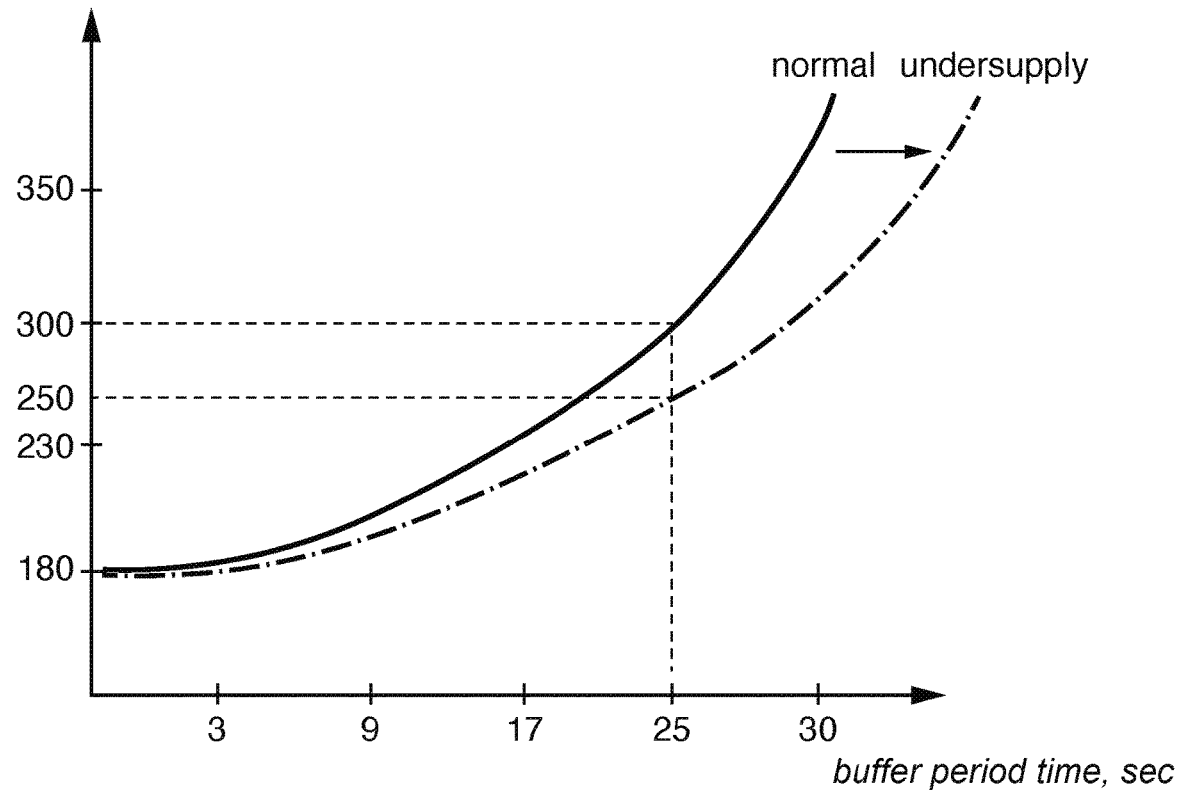
FIG. 6 is a schematic graph of a function of a predetermined threshold ETA for a given taxi order, left unassigned during the given order assignment iteration in the given area, from a buffer period time of suspending the given taxi order until processing it during a next order assignment iteration, following the given order assignment iteration, in accordance with certain non-limiting embodiments of the present technology.

For example, during the peak hours, when the given area is experiencing an undersupply of vehicles, the server 250 can be configured to increase the constant coefficient c, which results in the predetermined threshold ETA being less responsive to a growth of the buffer period time, as illustrated by a graph of the above Equation 2 of the predetermined threshold ETA with respect to the buffer period time, schematically depicted in FIG. 6, in accordance with certain non-limiting embodiments of the present technology.

Figure 7:
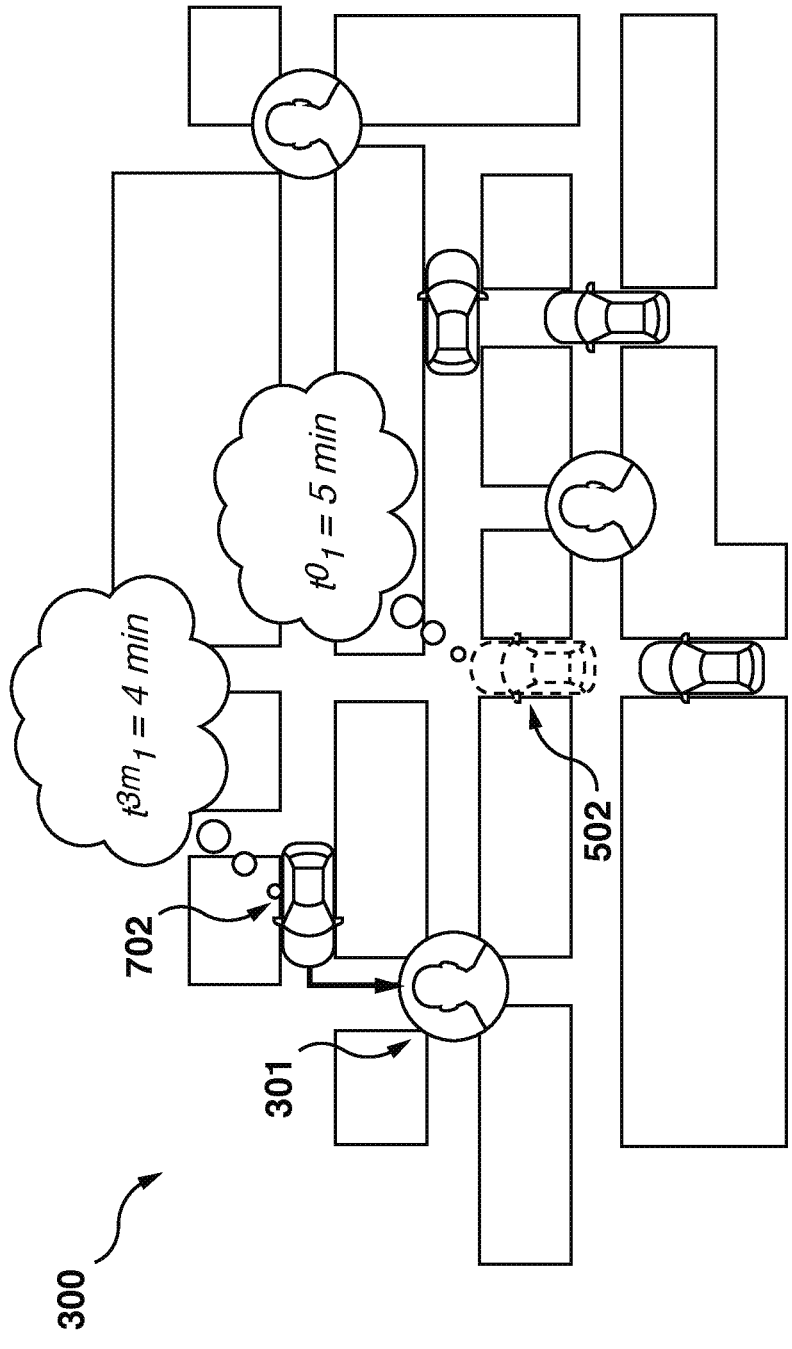
FIG. 7 depicts the roadmap section of the given area illustrating an example approach to assigning, by the server of the networked computing environment of FIG. 2, the given taxi order, left unassigned from the given order assignment iteration, to one of vehicles during the next order assignment iteration, in accordance with certain non-limiting embodiments of the present technology.

With reference to FIG. 7, there is depicted the roadmap section 300 corresponding to the given area at the next order assignment iteration, in accordance with certain non-limiting embodiments of the present technology.

Thus, for the next order assignment iteration, the server 250 can be configured to determine the predetermined threshold ETA for the first taxi order, left unassigned from the given order assignment iteration, as being 5 min. Further, using the optimization algorithm to minimize the aggregate ETA, the server 250 can be configured to assign, to the first taxi order of the first passenger 301, a third candidate vehicle 702, the respective ETA of which, for arriving at the pick-up location associated with the first taxi order, is 4 min, which is less than the predetermined threshold ETA for the next order assignment iteration.

With continued reference to FIG. 7 and with back reference to FIG. 5, it can be appreciated that, in certain cases, by suspending the first taxi order until the next order assignment iteration, due to the changed coverage of the given area with available vehicles, the server 250 can be configured to identify a vehicle capable of arriving at the pick-up location associated with the first taxi order faster, that is, the third candidate vehicle 702 having the respective modified ETA for picking up the first passenger 301, $t^{3m}_1=4$ min, than that available during the given order assignment iteration, that is, the second candidate vehicle 304, having the respective modified ETA for picking up the first passenger 301, $t^{2m}_1=8$ min. Thus, by doing so, certain non-limiting embodiments of the present technology can allow reducing the waiting time of the passengers for vehicles to execute their taxi orders.

Further, as mentioned above, the server 250 can be configured to cause dispatching of the third candidate vehicle 702 to the first taxi order by transmitting, to the driver of the third candidate vehicle 702, via the respective GUI of the driver application of the online transportation platform 260, the respective notification and the indication of the route to the respective pick-up location associated with the first taxi order, as mentioned above.

Method

Figure 8:
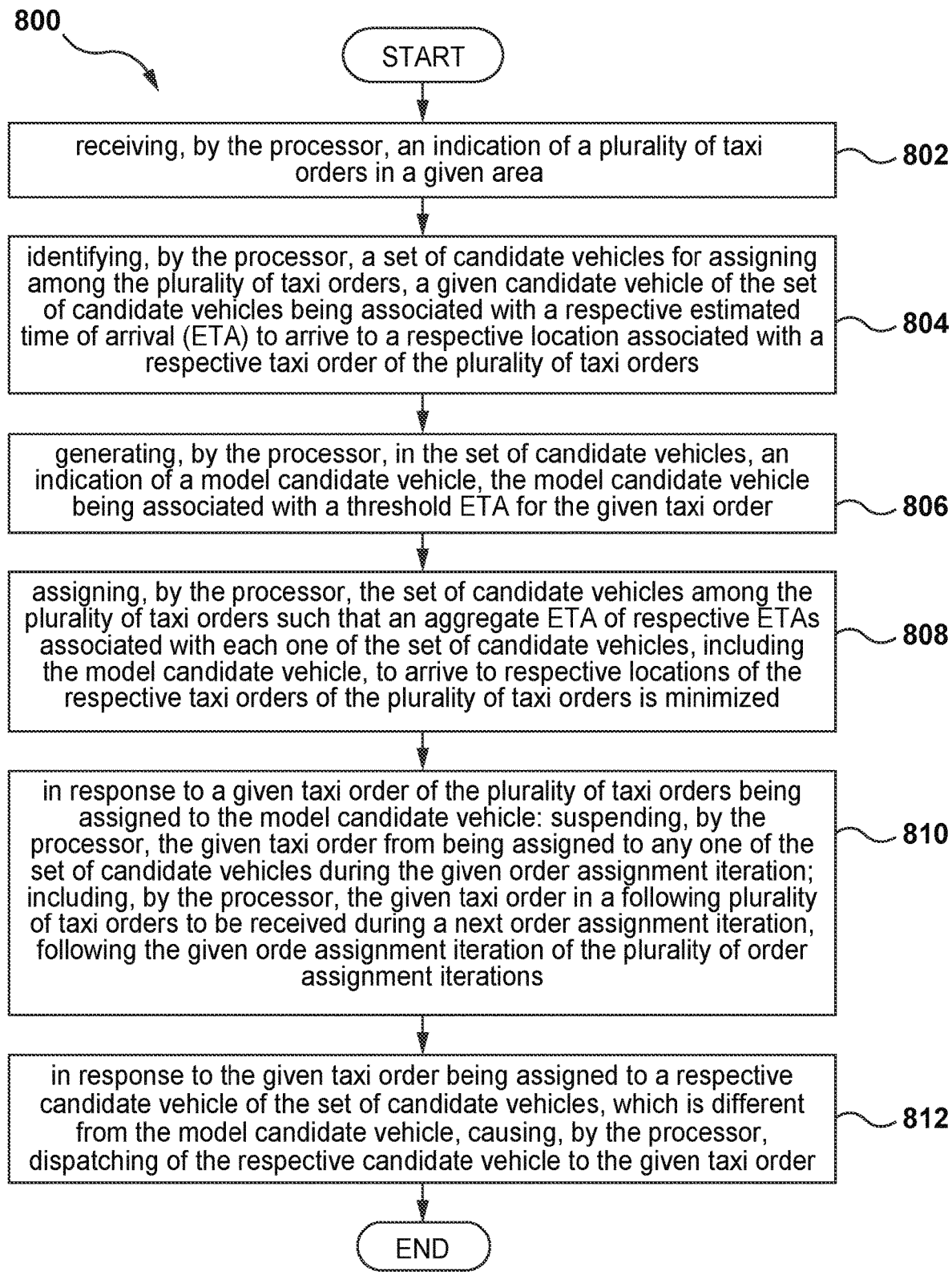
FIG. 8 depicts a flowchart diagram of a method of assigning, by the server of the networked computing environment of FIG. 2, the taxi orders to the vehicles, in accordance with certain non-limiting embodiments of the present technology.

Given the architecture and the examples provided hereinabove, it is possible to execute a method of assigning the vehicles to taxi orders, such as the set of candidate vehicles to the batch of taxi orders 240, as described above with reference to FIGS. 3 to 7. With reference now to FIG. 8, there is depicted a flowchart of a method 800, according to certain non-limiting embodiments of the present technology. The method 800 may be executed by the server 250.

Step 802: Receiving, by the Processor, an Indication of a Plurality of Taxi Orders in a Given Area At step 802, according to certain non-limiting embodiments of the present technology, at the given order assignment iteration defined as described above, the server 250 can be configured to receive, from respective ones of the plurality of passenger devices 210, over the communication network 270, the indication of the batch of taxi orders 240 in the given area. As described above with reference to FIG. 3, according to certain non-limiting embodiments of the present technology, the batch of taxi orders 240 in the given area during the given order assignment iteration can include the first taxi order of the first passenger 301 and the second taxi order of the second passenger 303.

As noted hereinabove, each one of the first and second passengers 301, 303 can be enabled to submit the respective one of the first and second taxi orders using the booking GUI of the passenger application of the online transportation platform 260 running on the respective ones of the plurality of passenger devices 210.

The method 800 hence advances to step 804.

Step 804: Identifying, by the Processor, a Set of Candidate Vehicles for Assigning Among the Plurality of Taxi Orders, a Given Candidate Vehicle of the Set of Candidate Vehicles being Associated with a Respective Estimated Time of Arrival (Eta) to Arrive to a Respective Location Associated with a Respective Taxi Order of the Plurality of Taxi Orders At step 804, according to certain non-limiting embodiments of the present technology, the server 250 can be configured to identify, based, for example, on the roadmap data and the sensor data of the plurality of vehicle devices 235, in the given area, the set of candidate vehicles for accommodating the batch of taxi orders 240. In the example of FIG. 3, the server 250 can be configured to identify the set of candidate vehicles including the first and second candidate vehicles 302, 304.

Further, as mentioned further above with reference to FIG. 3, the server 250 can be configured to determine, for each of the first and second candidate vehicles 302, 304 of the set of candidate vehicles, the respective ETAs to arrive to the associated pick-up locations (not separately numbered) of each of the first and second taxi orders. More specifically, the server 250 could be configured to determine, based on the roadmap data and real-time traffic data described above, that the first candidate vehicle 302 can arrive (i) at the respective pick-up location of the first taxi order within the respective ETA $t^1_1=2$ min; and (ii) at the respective pick-up location of the second taxi order within the respective ETA $t^1_2=6$ min. Similarly, the server 250 could be configured be configured to determine that the second candidate vehicle 304 can arrive (i) at the respective pick-up location of the first taxi order within the respective ETA $t^2_1=8$ min; and (ii) at the respective pick-up location of the second taxi order within the respective ETA $t^2_2=10$ min.

Further, according to certain non-limiting embodiments of the present technology, the server 250 can be configured to modify the respective ETA of the given candidate vehicle of the set of candidate vehicles, such as one of the first and second candidate vehicles 302, 304, to arrive at the pick-up location of the given one of the batch of taxi orders 240 based on the vehicle features associated with the given candidate vehicle. More specifically, according to certain non-limiting embodiments of the present technology, the server 250 can be configured to: (i) determine, based on the vehicle features associated with the given candidate vehicle, the respective vehicle score; and (ii) apply the respective vehicle score to the respective ETA of the given candidate vehicle for the given one of the batch of taxi orders 240 to determine the respective modified ETA.

According to certain non-limiting embodiments of the present technology, the vehicle features can include, without limitation at least one of: (i) the safety parameter associated with the given candidate vehicle for taking the given one of the batch of taxi orders 240; (ii) the number of candidate vehicles in the set of candidate vehicles available during the given order assignment iteration; and (iii) the desired vehicle product features specified in the given one of the batch of taxi orders 240.

According to certain non-limiting embodiments of the present technology, the safety parameter associated with the given candidate vehicle is indicative of a likelihood value of an accident involving the given candidate vehicle on a given route, such as the route to at least one of the respective pick-up location and the respective drop-off location associated with the given one of the batch of taxi orders 240. In various non-limiting embodiments of the present technology, the server 250 can be configured to determine the safety parameter based on at least one of: (i) the driver information of the given candidate vehicle, as described above with respect with the driver of the vehicle 237; (ii) the route information of the route to at least one of the respective pick-up location and the respective drop-off location associated with the given one of the batch of taxi orders 240.

According to certain non-limiting embodiments of the present technology, the route information about the given route within the roadmap can include at least one of: (i) an average speed value on the given route; (ii) an average number of lanes along the given route; (iii) an average bandwidth of the given route, which can be expressed, for example, in a number of vehicles passing along the given route a day; (iv) a route length of the given route; and (v) a number of accidents occurred on the given route in a predetermined period, such as a week, a month, or a year.

More specifically, to determine the safety parameter associated with the given route, in some non-limiting embodiments of the present technology, the server 250 can be configured to determine: (i) based on the driver information associated with the driver of the given candidate vehicle, the driver security score associated with the driver of the given candidate vehicle; (ii) based on the route information associated with the given route, the route security score associated with the given route; and (iii) determine, based on, on the driver security score and the route security score, the likelihood value of accident involving the given candidate vehicle on the route the at least one of the respective pick-up location and the respective drop-off location associated with the given one of the batch of taxi orders 240.

Thus, as described above with reference to FIG. 4, based on the desired vehicle product features of each one of the first and second candidate vehicles 302, 304, the server 250 can be configured to decrease the respective ETA of the first candidate vehicle 302 for the second taxi order, $t^1_2=6$ min, to the respective modified ETA, $t^m_2=4$ min. Further, the server 250 can be configured to increase the respective ETA of the second candidate vehicle 304 for the second taxi order, $t^2_2=10$ min, to the respective modified ETA, $t^{2m}_2=14$ min.

The method 800 hence advances to step 806.

Step 806: Generating, by the Processor, in the Set of Candidate Vehicles, an Indication of a Model Candidate Vehicle, the Model Candidate Vehicle being Associated with a Threshold Eta for the Given Taxi Order At step 806, according to certain non-limiting embodiments of the present technology, the server 250 can be configured to generate, in the set of candidate vehicles, the indication of the respective model candidate vehicle associated with the predetermined threshold ETA for arriving at the respective pick-up location of each one of batch of taxi orders 240.

For example, as described above withe reference to FIG. 5, the server 250 can be configured to generate, for the first taxi order of the batch of taxi orders 240, the indication of the model candidate vehicle 502 having the predetermined threshold ETA $t^0_1=4$ min.

According to certain non-limiting embodiments of the present technology, the predetermined threshold ETA can be selected based on parameters of the given area, such as, without limitation, (i) the demographics of the given area; (ii) the average vehicle demand therein; (iii) a number of vehicles deployed by the online transportation platform 260 in the given area; (iv) current environmental conditions in the given area, such as weather, a level of air pollution, time of day, and others; (v) the respective ETAs and/or respective modified ETAs of each one of the set of candidate vehicles, as described above; (vi) certain marketing considerations; and the like.

Thus, depending on at least some of these factors, the predetermined threshold ETA can be selected, for the given area, as being 3, 4, 5, or 10 min, for example. Thus, in some non-limiting embodiments of the present technology, for some geographically different areas covered by the ridesharing services of the online transportation platform 260, the predetermined threshold ETA can be different. By way of example, in those embodiments where the given area is a city, the predetermined threshold ETA for picking up the given passenger in Moscow can be 5 min, whereas in Montreal, a city smaller than Moscow, the predetermine threshold ETA can be 3 min, for example. However, embodiments where the predetermined threshold ETA for geographically different areas is the same are also envisioned without departing from the scope of the present technology.

The method 800 thus proceeds to step 808.

Step 808: Assigning, by the Processor, the Set of Candidate Vehicles Among the Plurality of Taxi Orders Such that an Aggregate Eta of Respective Etas Associated with Each One of the Set of Candidate Vehicles, Including the Model Candidate Vehicle, to Arrive to Respective Locations of the Respective Taxi Orders of the Plurality of Taxi Orders is Minimized Further, as mentioned further above with reference to FIG. 5, in some non-limiting embodiments of the present technology, the server 250 can be configured to assign the set of candidate vehicles, including the model candidate vehicle 502, to the batch of taxi orders 240 such that the aggregate ETA of the set of candidate vehicles is minimized. As mentioned hereinabove, in some non-limiting embodiments of the present technology, the server 250 can be configured to determine the aggregate ETA based on the respective (actual) ETAs of each one of the set of candidate vehicles. In other non-limiting embodiments of the present technology, the server 250 can be configured to determine the aggregate ETA based on the respective modified ETAs of each one of the set of candidate vehicles, determined as described at step 804.

Further, to assign the set of candidate vehicles considering the minimized aggerate ETA, the server 250 can be configured to execute the optimization algorithm. According to certain non-limiting embodiments of the present technology, the optimization algorithm can include a combinatorial optimization algorithm, such as, a Hungarian optimization algorithm, as an example. It should be expressly understood that use of other optimization algorithms for minimizing the aggregate ETA is also envisioned without departing from the scope of the present technology.

Thus, continuing with the example of FIG. 5, by minimizing the aggregate ETA during the given order assignment iteration, the server 250 can be configured to assign: (i) the first candidate vehicle 302 to the second taxi order, submitted by the second passenger 303; and (ii) the model candidate vehicle 502 to the first taxi order, submitted by the first passenger 301.

The method 800 hence advances to step 810.

Step 810: In Response to a Given Taxi Order of the Plurality of Taxi Orders being Assigned to the Model Candidate Vehicle: Suspending, by the Processor, the Given Taxi Order from being Assigned to any One of the Set of Candidate Vehicles During the Given Order Assignment Iteration; Including, by the Processor, the Given Taxi Order in a Following Plurality of Taxi Orders to be Received During a Next Order Assignment Iteration, Following the Given Order Assignment Iteration of the Plurality of Order Assignment Iterations Further, in response to the server 250 having assigned the given one of thee batch of taxi orders 240 to the respective model candidate vehicle, such as the first taxi order to the model candidate vehicle 502, at step 810, the server 250 can further be configured to suspend the first taxi order from assigning to any one of the set of candidate vehicles during the given order assignment iteration until the next order assignment iteration, following thereafter. Further, during the next order assignment iteration, the server 250 can be configured to (1) include the first taxi order, left unassigned from the given order assignment iteration, to the following batch of taxi orders, having been accumulated by the next order assignment iteration; and (2) identify a respective actual vehicle for the first taxi order in a similar fashion as described above. As it can be appreciated, if during the next order assignment iteration, the server 250 fails to assign the first taxi order to the respective actual vehicle assigning the first taxi order to the model candidate vehicle 502 again, the server 250 can be configured to suspend the first taxi order from assigning to any vehicle during the next order assignment iteration and transfer the first taxi order to a further next order assignment iteration, following the next order assignment iteration.

In some non-limiting embodiments of the present technology, to increase a likelihood of the first taxi order, left from the given order assignment iteration, being assigned to the respective actual vehicle during a given next order assignment iteration, the server 250 can be configured, further to including the first taxi order to the following batch of taxi orders, increase the predetermined threshold ETA of the model candidate vehicle 502. According to certain non-limiting embodiments of the present technology, the server 250 can be configured to increase the predetermined threshold ETA based on a buffer period time until including the first taxi order to the following batch of taxi order. For example, in some non-limiting embodiments of the present technology, for each next order assignment iteration, the server 250 can be configured to increase the predetermined threshold ETA of the model candidate vehicle 502 by a predetermined incremental value, such as 1, 2, or 5 min, as an example. In another example, for each next order assignment iteration, the server 250 can be configured to increase the predetermined threshold ETA of the model candidate vehicle 502 a predetermined multiplier times, such as 1.5, 2.0, or 3.0, as an example.

However, in accordance with certain non-limiting embodiments of the present technology, the server 250 can be configured to increase the predetermined threshold ETA exponentially with respect to the buffer period time until including the first taxi order to the following batch of taxi order, received at the next order assignment iteration, as expressed by Equation 2 above.

As it can be appreciated, in response to the server 250 assigning none of the batch of taxi orders 240 to the respective model candidate vehicle, the method 800 skips step 810, and proceeds directly to step 812.

The method thus advances to step 812.

Step 812: In Response to the Given Taxi Order being Assigned to A Respective Candidate Vehicle of the Set of Candidate Vehicles, which is Different from the Model Candidate Vehicle, Causing, by the Processor, Dispatching of the Respective Candidate Vehicle to the Given Taxi Order However, in response to assigning the given taxi order to the respective candidate vehicle, which is different from the respective model candidate vehicle, such as (i) the second taxi order to the first candidate vehicle 302 during the given order assignment iteration, as depicted in the example of FIG. 5, or (ii) the first taxi order to the third candidate vehicle 702 during the next order assignment iteration, as depicted in the example of FIG. 7, at step 812, the server 250 can be configured to cause dispatching of the respective candidate vehicle to the given taxi order by transmitting, to the driver of the respective vehicle, via the respective GUI of the driver application of the online transportation platform 260, the respective notification and the indication of the route to the respective pick-up location associated with the given taxi order, as mentioned above.

Thus, by suspending the given taxi order, left unassigned from the given order assignment iteration, until the next order assignment iteration, certain non-limiting embodiments of the method 800 may allow identifying a vehicle capable of arriving at the pick-up location associated with the given taxi order faster than that available during the given order assignment iteration, due to the changed coverage of the given area with available vehicles. Thus, by doing so, certain non-limiting embodiments of the present technology can allow reducing the waiting time of the passengers for vehicles to execute their taxi orders.

The method 800 hence terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

The invention claimed is:

1. A computer-implemented method of assigning vehicles to taxi orders, the method being executable by a processor, the processor being communicatively accessible by the vehicles, the method comprising:
during a given order assignment iteration of a plurality of order assignment iterations, executing:
receiving, by the processor, an indication of a plurality of taxi orders in a given area;
identifying, by the processor, a set of candidate vehicles for assigning among the plurality of taxi orders,
a given candidate vehicle of the set of candidate vehicles being associated with a respective estimated time of arrival (ETA) to arrive to a respective location associated with a respective taxi order of the plurality of taxi orders;

generating, by the processor, in the set of candidate vehicles, an indication of a model candidate vehicle, the model candidate vehicle being associated with a threshold ETA for the given taxi order;

assigning, by the processor, the set of candidate vehicles among the plurality of taxi orders such that an aggregate ETA of respective ETAs associated with each one of the set of candidate vehicles, including the model candidate vehicle, to arrive to respective locations of the respective taxi orders of the plurality of taxi orders is minimized;

in response to a given taxi order of the plurality of taxi orders being assigned to the model candidate vehicle:

suspending, by the processor, the given taxi order from being assigned to any one of the set of candidate vehicles during the given order assignment iteration;

including, by the processor, the given taxi order in a following plurality of taxi orders to be received during a next order assignment iteration, following the given order assignment iteration of the plurality of order assignment iterations; and in response to the given taxi order being assigned to a respective candidate vehicle of the set of candidate vehicles, which is different from the model candidate vehicle, causing, by the processor, dispatching of the respective candidate vehicle to the given taxi order.

2. The method of claim 1, wherein prior to the generating the indication of the model candidate vehicle, the method further comprises:

for the given candidate vehicle, determining, by the processor, a respective score indicative of vehicle features associated with the given candidate vehicle;

applying, by the processor, the respective score to the respective ETA to determine a respective modified ETA for the given candidate vehicle; and wherein:

the assigning the set of candidate vehicles among the plurality of taxi orders is based on respective modified ETAs associated with each one of the set of candidate vehicles.

3. The method of claim 2, wherein the vehicle features of the given candidate vehicle comprise at least one of: (i) a safety parameter associated with the given candidate vehicle; (ii) a number of candidate vehicles in the set of candidate vehicles; and (iii) product features of the given candidate vehicle.

4. The method of claim 3, the safety parameter is indicative of a likelihood value of an accident involving the given candidate vehicle on a route to the respective location associated with the respective taxi order.

5. The method of claim 4, further comprising determining, by the processor, the safety parameter associated with the given candidate vehicle based on at least one of: (i) a driver security score of a driver of the given candidate vehicle; and (ii) route security score associated with the route to the respective location associated with the respective taxi order.

6. The method of claim 5, further comprising determining the driver security score based at least on one of: (i) driver-specific features of the driver; (ii) a driving experience of the driver; (iii) a driving style of the driver; (iv) a number of past accidents of the driver; and (v) a traffic rule compliance rate associated with the driver.

7. The method of claim 3, wherein the product features of the given candidate vehicle comprise at least one of: a brand and a model of the given candidate vehicle; an issue year of the given candidate vehicle; a volume of a trunk of the given candidate vehicle; and a presence of a child seat in the given candidate vehicle.

8. The method of claim 1, wherein further to the including the given taxi order in the following plurality of taxi orders, the method comprises increasing, by the processor, the threshold ETA for the given taxi order for the next order assignment iteration.

9. The method of claim 8, wherein the increasing the threshold ETA comprises increasing the threshold ETA such that the greater a buffer time period until the including the given taxi order in the following plurality of taxi orders is, the greater the threshold ETA for the given taxi order for the next order assignment iteration is.

10. The method of claim 9, wherein the increasing the threshold ETA comprises increasing the threshold ETA exponentially with respect to the buffer time period.

11. The method of claim 10, wherein the increasing the threshold ETA is executed in accordance with an equation:

$$thershold\ ETA = d + a \cdot e^{b+c \cdot buffer\ period\ time},$$

where d is an initial value of the threshold ETA prior to the increasing;

buffer period time is the buffer period time until the including the given taxi order in the following plurality of taxi orders; and a, b, and c are constant coefficients.

12. The method of claim 1, further comprising determining, by the processor, the threshold ETA based on at least one of: environmental conditions in the given area; and respective ETAs of each one of the set of the candidate vehicles.

13. The method of claim 12, wherein, prior to the increasing the threshold ETA for the given taxi order, the threshold ETA is the same for each one of the plurality of taxi orders in the given area.

14. The method of claim 13, wherein the threshold ETA is different for taxi orders in an other area, geographically different from the given area.

15. The method of claim 13, wherein the threshold ETA for geographically different areas is the same.

16. A server for assigning vehicles to taxi orders, the server including a processor and a non-transitory computer-readable memory storing instructions; and the processor, upon executing the instructions, being configured to:

during a given order assignment iteration of a plurality of order assignment iterations, execute:

receiving an indication of a plurality of taxi orders in a given area;

identifying a set of candidate vehicles for assigning among the plurality of taxi orders, a given candidate vehicle of the set of candidate vehicles being associated with a respective estimated time of arrival (ETA) to arrive to a respective location associated with a respective taxi order of the plurality of taxi orders;

generating, in the set of candidate vehicles, an indication of a model candidate vehicle, the model candidate vehicle being associated with a threshold ETA for the given taxi order;

assigning the set of candidate vehicles among the plurality of taxi orders such that an aggregate ETA of respective ETAs associated with each one of the set of candidate vehicles, including the model candidate vehicle, to arrive to respective locations of the respective taxi orders of the plurality of taxi orders is minimized;

in response to a given taxi order of the plurality of taxi orders being assigned to the model candidate vehicle:

suspending the given taxi order from being assigned to any one of the set of candidate vehicles during the given order assignment iteration;

including the given taxi order in a following plurality of taxi orders to be received during a next order assignment iteration, following the given order assignment iteration of the plurality of order assignment iterations; and in response to the given taxi order being assigned to a respective candidate vehicle of the set of candidate vehicles, which is different from the model candidate vehicle, causing dispatching the respective candidate vehicle to the given taxi order.

17. The server of claim 16, wherein the processor, prior to the generating the indication of the model candidate vehicle, is further configured to:

for the given candidate vehicle, determine a respective score indicative of vehicle features associated with the given candidate vehicle;

apply the respective score to the respective ETA to determine a respective modified ETA for the given candidate vehicle; and wherein:

the assigning the set of candidate vehicles among the plurality of taxi orders is based on respective modified ETAs associated with each one of the set of candidate vehicles.

18. The server of claim 16, wherein further to the including the given taxi order in the following plurality of taxi orders, the processor is configured to increase the threshold ETA for the given taxi order for the next order assignment iteration.

19. The server of claim 18, wherein the processor is configured to increase the threshold ETA such that the greater a buffer time period until the including the given taxi order in the following plurality of taxi orders is, the greater the threshold ETA for the given taxi order for the next order assignment iteration is.

20. The server of claim 19, wherein the processor is configured to increase the threshold ETA exponentially with respect to the buffer time period.

* * * * *